(12) United States Patent
Kim et al.

(10) Patent No.: US 10,731,972 B2
(45) Date of Patent: Aug. 4, 2020

(54) INSTANTANEOUS PHASE MAPPING DEFLECTOMETRY

(71) Applicant: Arizona Board of Regents on Behalf of the University of Arizona, Tucson, AZ (US)

(72) Inventors: Dae Wook Kim, Tucson, AZ (US); Isaac Trumper, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 0 days.

(21) Appl. No.: 16/462,187

(22) PCT Filed: Nov. 17, 2017

(86) PCT No.: PCT/US2017/062411
§ 371 (c)(1),
(2) Date: May 17, 2019

(87) PCT Pub. No.: WO2018/094277
PCT Pub. Date: May 24, 2018

(65) Prior Publication Data
US 2019/0316898 A1    Oct. 17, 2019

Related U.S. Application Data

(60) Provisional application No. 62/424,362, filed on Nov. 18, 2016.

(51) Int. Cl.
*G01B 11/24*    (2006.01)

(52) U.S. Cl.
CPC .................. *G01B 11/2441* (2013.01)

(58) Field of Classification Search
CPC ..................... G01B 11/2441; G01B 11/25
See application file for complete search history.

(56) References Cited

U.S. PATENT DOCUMENTS

| 5,309,222 A | 5/1994 | Kamei et al. |
| 6,438,272 B1 * | 8/2002 | Huang ............... G01B 11/2527 356/4.09 |

(Continued)

OTHER PUBLICATIONS

Asundi, A. et al., Fast phase-unwrapping algorithm based on a grayscale mask and flood fill, Appl. Opt. 37(23), 5416-5420 (1998).

(Continued)

*Primary Examiner* — Jonathan M Hansen
(74) *Attorney, Agent, or Firm* — Perkins Coie LLP

(57) ABSTRACT

Provided are instantaneous phase mapping deflectometry measurement systems and methods based on multiplexing phase shifted fringe patterns with color, and decomposing them in X and Y using Fourier techniques. The new methods and devices provide accurate measurements, and more robust tools with less uncertainty when reconstructing a surface (e.g., compared to prior art Fourier Transform Profilometry (FTP) methods). The systems and methods revolutionize the applications of deflectometry by enabling measuring dynamic events (e.g., in high vibration environments, and a host of other previously impossible scenarios), and including environmental changes to the bending modes of large optics. Methods of error correction applicable to the new methods and devices are also provided.

24 Claims, 10 Drawing Sheets

(56) References Cited

U.S. PATENT DOCUMENTS

| | | | |
|---|---|---|---|
| 6,816,247 | B1 | 11/2004 | Heppner et al. |
| 7,230,718 | B2 | 6/2007 | Millerd et al. |
| 7,889,356 | B2 | 2/2011 | Kuchel |
| 2007/0206204 | A1 | 9/2007 | Jia et al. |
| 2009/0238449 | A1* | 9/2009 | Zhang ............... G01B 11/2536 382/165 |
| 2017/0186184 | A1* | 6/2017 | Kwak .................... G06T 7/521 |

OTHER PUBLICATIONS

Bothe, T. et al., High-resolution 3D shape measurement on specular surfaces by fringe reflection, Proc. SPIE 5457 411-422 (2004).
Butel, G.P. et al., Deflectometry using portable devices, Opt. Eng. 54(2), 025111 (2015).
Butel, G.P. et al., Optimization of dynamic structured illumination for surface slope measurements, Proc. SPIE 8493, 84930S (2012).
De Groot, P., Generating fringe-free images from phase-shifted interferometry data, Appl. Opt. 44(33), 7062-7069 (2005).
Faber, C. et al., Deflectometry challenges interferometry: the competition gets tougher! Proc. SPIE 8493, 84930R (2012).
Flores, J. L. et al., Color-fringe pattern profilometry using a generalized phase-shifting algorithm, Appl. Opt. 54(30), 8827-8834 (2015).
Huang, L. et al., Dynamic three-dimensional sensing for specular surface with monoscopic fringe reflectometry, Opt. Express 19(13), 12809-12814 (2011).
Huang, L. et. al., Comparison of Fourier transform, windowed Fourier transform, and wavelet transform methods for phase extraction from a single fringe pattern in fringe projection profilometry, Opt. and Lasers in Eng. 48, 141-148 (2010).
Kemao, Q., Two-dimensional windowed Fourier transform for fringe pattern analysis: Principles, applications, and implementations, Opt. and Lasers in Eng. 45, 304-317 (2007).
Kemao, Q., Windowed Fourier transform for fringe pattern analysis, Appl. Opt. 43(13), 2695-2702 (2004).
Kimbrough, B. et al., Low coherence vibration insensitive Fizeau interferometer, Proc. SPIE 6292, 62920F (2006).
Knauer, M. et al., Phase measuring deflectometry: a new approach to measure specular free-form surfaces, Proc. SPIE 5457, 366-376 (2004).
Liu, F. et al., Correction of phase extraction error in phase-shifting interferometry based on Lissajous figure and ellipse fitting technology, Opt. Express 23(8), 10794-10807 (2015).
Madec, P.-Y., Overview of deformable mirror technologies for adaptive optics and astronomy, Proc. of SPIE 8447, 844705 (2012).
Noll, R. J., Zernike polynomials and atmospheric turbulence, J. Opt. Soc. Am. 66(3), 207-211 (1976).
Novak, M. et al., Analysis of a micropolarizer array-based simultaneous phase-shifting interferometer, Appl. Opt. 44(32), 6861-6868 (2005).
Schreiber, H. et al., Phase shifting interferometry, Optical Shop Testing, Third Edition, D. Malacara, ed. (Wiley, 2007).
Southwell, W.H., Wave-front estimation from wave-front slope measurements, J. Opt. Soc. Am. 70(8), 998-1006 (1980).
Su, P. et al., Non-null full field X-ray mirror metrology using SCOTS: a reflection deflectometry approach, Opt. Express 20(11),12393-12406 (2012).
Su, P. et al., Software configurable optical test system: a computerized reverse Hartmann test, Appl. Opt. 49(23), 4404-4412 (2010).
Su, P. et. al., SCOTS: A reverse Hartmann test with high dynamic range for Giant Magellan Telescope primary mirror segments, Proc. SPIE 8450, 84500W (2012).
Su, T. et al., Measuring rough optical surfaces using scanning long-wave optical test system, Appl. Opt. 52(29) 7117-7126 (2013).
Sykora, D.M. et al., Instantaneous measurement Fizeau interferometer with high spatial resolution, Proc. SPIE 8126, 812610 (2011).
Takeda, M., Spatial-carrier fringe-pattern analysis and its applications to precision interferometry and profilometry: An overview, Elsevier Ind. Met., 79-99 (1990).
Trumper, I. et al., Instantaneous phase shifting deflectometry, Opt. Express 24(24), 27993-28007 (2016).
Wang, Z. et al., Advanced iterative algorithm for phase extraction of randomly phase-shifted interferograms, Opt. Lett. 29(14), 1671-1673 (2004).
Wu, Y. et. al., Dynamic specular surface measurement based on color encoded fringe reflection technique, Opt. Eng. 55(22), 024104 (2016).
Wu, Y. et. al., Improved composite Fourier transform profilometry, Opt. and Laser Tech. 44, 2037-2042 (2012).
Xie, P. et al., Three-dimensional shape measurement of specular surfaces by orthogonal composite fringe reflection, Proc. SPIE 8200, 820014 (2011).
Yue, H. et al., Fourier transform prfilometry based on composite structured light pattern, Opt. and Laser Tech. 39, 1170-1175 (2007).
Zhang, Z.H., Review of single-shot 3D shape measurement by phase calculation-based fringe projection techniques, Opt. and Lasers in Eng. 50, 1097-1106 (2012).
International Search Report and Written Opinion for International Patent Application No. PCT/US17/62411, dated Feb. 12, 2018 (10 pages).

* cited by examiner

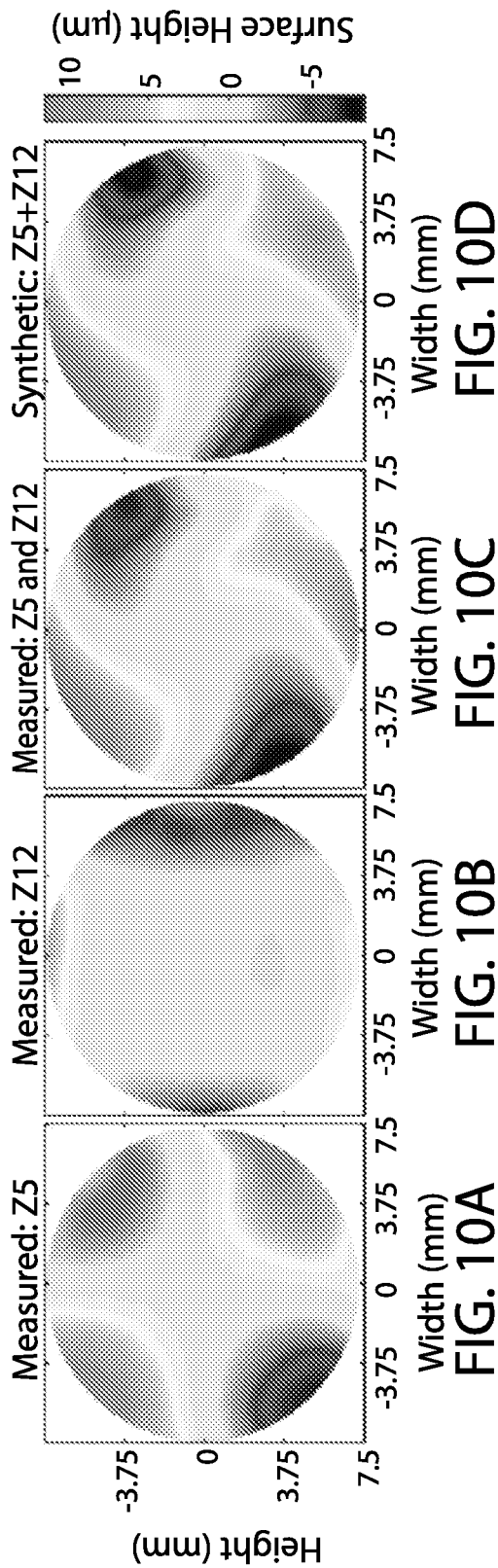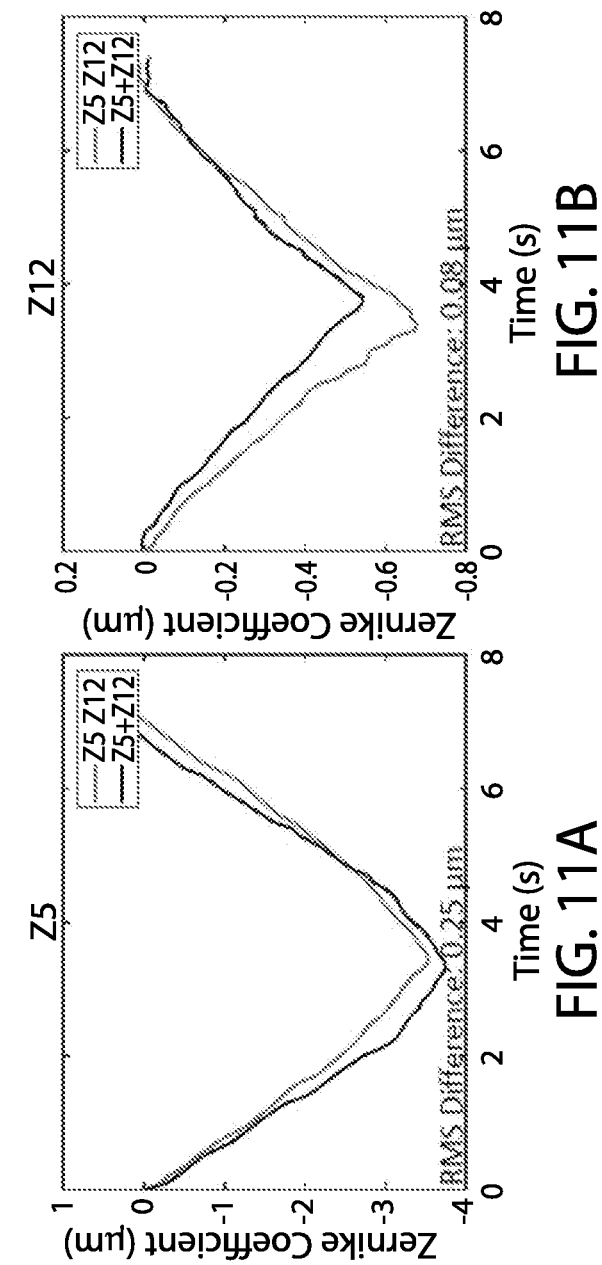

INSTANTANEOUS PHASE MAPPING DEFLECTOMETRY

CROSS REFERENCE TO RELATED APPLICATIONS

This patent document is a 371 National Phase Application of International Patent Application No. PCT/US2017/062411, filed Nov. 17, 2017, which claims priority to U.S. Provisional Patent Application No. 62/424,362, filed Nov. 18, 2016. The entire contents of the aforementioned patent applications are incorporated by reference as part of the disclosure of this patent document.

FIELD OF THE INVENTION

The present disclosure relates generally to optics and metrology, and more specifically to a surprisingly effective system and method for instantaneous phase mapping deflectometry enabling dynamic deflectometry measurements (real-time deflectometry data acquisition).

BACKGROUND

Deflectometry is a surface slope measuring tool that requires minimal hardware and acquires surface height data with nanometer-level precision (Su, P., et al., Appl. Opt. 49(23), 4404-4412 (2010); Knauer, M., et al., Proc. SPIE 5457 366-376 (2004); and Bothe, T., et al., Proc. SPIE 5457 411-422 (2004)). It directly measures slope data, and has a very large dynamic range (P. Su et. al., "SCOTS: A reverse Hartmann test with high dynamic range for Giant Magellan Telescope primary mirror segments," Proc. SPIE 8450, 84500W (2012)). At the most basic level, a deflectometry system must have a screen to display a pattern, and a camera to capture images of the surface (e.g., mirror, lens, etc.) under test, which is illuminated by the screen. A schematic of a deflectometry measurement setup is shown in FIG. 1 with relevant distances for use, in this example, with a mobile device. The camera hardware is chosen from off-the-shelf components where low signal-to-noise and fast acquisition times are desirable. The screens are also off-the-shelf, but the patterns displayed on the screens are areas of active research. To create a mapping, current deflectometry systems use display patterns such as line-scanning, binary patterns, and phase shifting (Butel, G. P., et al., Proc. SPIE 8493, 84930S (2012)). All of the prior art methods listed rely on changing the pattern with time and recording multiple images with the camera to reconstruct the optical surface under test. These methodologies cannot cope with time varying measurements because they multiplex information in the time domain. In doing this, they are limited to measurements in which the environment, or features on the surface, do not change in time.

In the field of laser interferometry, polarization to multiplex phase shifted data (Novak, M., et al., Appl. Opt. 44(32), 6861-6868 (2005); and Millerd & Wyant. U.S. Pat. No. 7,230,718 (2007)) uses spatial frequency carriers (Takeda, M. Elsevier Ind. Met., 79-99 (1990); and Sykora & P. de Groot, Proc. SPIE 8126, 812610 (2011)), and 2D grating structures (Kimbrough, B., et al., Proc. SPIE 6292 62920F (2006)). With these systems, measurements over very large path lengths and in unstable or turbulent environments are possible. However, phase shifting interferometry (PSI) requires a minimum of three phase shifted data sets (i.e., $\Delta\phi=0$, $\pi/3$, $2\pi/3$) to reconstruct the surface under test (Schreiber & Bruning, Optical Shop Testing, Third Edition, D. Malacara, ed. (Wiley, 2007)), and an instantaneous measurement on a phase shifting deflectometry system would need to multiplex twice the amount of information than a similar phase shifting interferometry system would need to multiplex. This is because deflectometry measures slope data, which must be captured in two orthogonal directions to properly reconstruct the surface. Therefore, the direction of the slope data must also be distinguishable during data processing. For example, using the minimum number of phase shifts (three), six data sets would be needed: three for one slope direction, and three for the other orthogonal slope direction.

Fourier Transform Profilometry, a distinct metrology method from phase shifting deflectometry, can also be used to measure the phase of a displayed pattern. It has been employed extensively in the field of fringe projection (Xie, P., et al., Proc. SPIE 8200 (14), 1-8 (2011); and Yue, H., et al., Opt. and Laser Tech. 39, 1170-1175 (2007)). More recently, an instantaneous deflectometry method using FTP has also been studied and presented in the literature (Wu, Y., et. al., Opt. Eng. 55(22), 024104 (2016), and Huang, L., et al., Opt. Express 19 (13), 12809-12814 (2011)). FTP captures a single image of a fringe pattern with both x and y direction fringes and uses Fourier analysis to reconstruct the phase information from the image. The frequency spectrum is filtered and then inverse Fourier transformed, which generates a real and imaginary result. These values are then used to calculate the phase of the original object. FTP has the benefit of only requiring two pieces of information to be multiplexed because the Fourier analysis can reconstruct the phase from just a single pattern. In the most recent publication using FTP, Wu et. al. used color to multiplex the x and y fringes, which is not required by the FTP analysis, but it allowed them to reduce errors in the frequency domain due to overlapping spectra. However, as is true for all Fourier domain filtering, the exact method of filtering the frequency data is not a trivial step because the end result depends significantly on the process (17 Z. H. Zhang, Opt. and Lasers in Eng. 50, 1097-1106 (2012)).

SUMMARY OF PARTICULAR ASPECTS OF THE INVENTION

Provided are instantaneous phase mapping deflectometry measurement systems and methods based on multiplexing phase shifted fringe patterns with color, and decomposing them in X and Y using Fourier techniques. The method revolutionizes the applications of deflectometry by enabling measuring dynamic events (e.g., in high vibration environments, and a host of other previously impossible scenarios), and including environmental changes to the bending modes of large optics. For example, we show that with a multiplexed display pattern and novel data processing, a video of time varying events in the measurement path can be played back.

All previous deflectometry methods are limited in the time domain, whereas the presently disclosed instantaneous PMD method imposes no such restriction, because all the necessary information is multiplexed into a single screen and captured with a single snapshot.

Applications of the disclosed systems and methods are not constrained to only measuring mirrored surfaces, but rather any surface that can create a specular reflection (e.g., a glass surface on a lens will work), and more generally to test any surface as long as the surface is reflective in the utilized wavelength. For example, if three different IR wavelengths were used for display (instead of RGB) for our instantaneous technique, it can be used measure a ground surface, which is reflective in IR.

Particular aspects provide a non-contact instantaneous phase mapping deflectometry system to measure a surface, comprising: a display positioned proximate a first side of the surface to be measured; a display pattern generator configured to generate a multiplexed pattern for display on the display, the multiplexed display pattern comprising, in each of two orthogonal directions, at least three fringe patterns, each fringe pattern comprising a plurality of fringes sufficient to provide a carrier frequency and each fringe pattern having distinct color-encoded phase shift information to provide a distinctly multiplexed display pattern comprising, in each of two orthogonal directions, a phase-shifted multiplexed fringe pattern having distinct color-encoded phase shift information; an imaging device positioned to detect an input image comprising at least a portion of the phase-shifted multiplexed fringe pattern after interaction with the surface, and to generate an electronic image thereof, the imaging device having at least three separately readable color channels to obtain at least three respective sets of data corresponding to the at least three phase shifts to provide at least three phase-shifted images; and an image analyzer configured to analyze each of the at least three phase-shifted images by Fourier transform to provide distinct peaks in the Fourier domain at the locations corresponding to the carrier frequencies of the display fringes in the x and y directions, the image analyzer configured to apply filters or masks that isolate only the x or y frequency to decompose each of the at least three phase-shifted images into two separate one-directional fringe images, the image analyzer configured to apply an inverse Fourier transform to the filtered data to reconstruct the one-directional fringe patterns that made up the input image to provide, based on a single input image, at least six unique outputs corresponding to the at least three phase shift fringe patters in both orthogonal directions required for reconstruction of the surface under test. In preferred aspects, no information is eliminated from the raw measurement data during the Fourier domain processing. The system may be further configured to: apply a three-phase step algorithm to each direction to generate four data sets; two wrapped phases and their modulation, one in each direction; unwrap the phases using a flood fill method or other suitable method, and convert it to slope data given in two directions, x and y, using system geometry parameters; and integrate the slope data using a Southwell zonal method or other suitable method to obtain a reconstructed surface. In the system, the plurality of fringes are preferably sufficient to provide a carrier frequency such that the component x and y fringes are distinguished with high fidelity in the Fourier domain. In the system, the at least three phase shifts may be or comprise red ($\Delta\phi=0$), green $\Delta\phi=\pi/3$, and blue $\Delta\phi=2\pi/3$. In the system, the input image may be a distorted version of the display image. The geometry of the system may be configured to be adjustable either by tilting or translating the display screen and the imaging device (e.g., camera) until a good set of measured fringes are obtained, to remove ambiguity in the Fourier domain and/or prevent issues with indistinguishable fringe direction. The system may be further configured to: compute a difference between a conventional phase shifting measurement and the instantaneous measurement for a common nominal state to provide a difference map; and apply the difference map as a correction in a surface height domain of a dynamic data set to remove spatial frequency errors.

Certain aspects provide a non-contact instantaneous phase mapping deflectometry system to measure a surface, comprising: a programmable display screen that is programmed to display a phase-shifted multiplexed fringe pattern having, in each of two orthogonal directions, distinct color-encoded phase shift information, such that when the screen is placed a known distance in front of a specular surface, the display screen will produce an input pattern reflected from the surface; an imaging device located proximate the display screen and focused on the surface, the imaging device configured to generate an output image to thereby provide slope information in two orthogonal directions based on a single input image comprising at least a portion of the input pattern reflected from the surface; and a computing device configured to calculate the slopes of the surface and to integrate the slopes to give the surface topography. In the system, the input image may be a distorted version of the display image. In the system, the phase-shifted multiplexed fringe pattern may comprise, in each of two orthogonal directions, at least three fringe patterns, each fringe pattern comprising a plurality of fringes sufficient to provide a carrier frequency and each fringe pattern having distinct color-encoded phase shift information to provide a distinctly multiplexed display pattern comprising, in each of two orthogonal directions, a phase-shifted multiplexed fringe pattern having distinct color-encoded phase shift information. In the system, the imaging device may be positioned to detect the input image, and to generate an electronic image thereof, the imaging device having at least three separately readable color channels to obtain at least three respective sets of data corresponding to the at least three phase shifts to provide at least three phase-shifted images. The system may be configured to analyze each of the at least three phase-shifted images by Fourier transform to provide distinct peaks in the Fourier domain at the locations corresponding to the carrier frequencies of the display fringes in the x and y directions, the system configured to apply filters or masks that isolate only the x or y frequency to decompose each of the at least three phase-shifted images into two separate one-directional fringe images, the system configured to apply an inverse Fourier transform to the filtered data to reconstruct the one-directional fringe patterns that made up the input image to provide, based on a single input image, at least six unique outputs corresponding to the at least three phase shift fringe patters in both orthogonal directions required for reconstruction of the surface under test. The system may be further configured to: apply a three-phase step algorithm to each direction to generate four data sets; two wrapped phases and their modulation, one in each direction; unwrap the phases using a flood fill method or other suitable method, and convert it to slope data given in two directions, x and y, using system geometry parameters; and integrate the slope data using a Southwell zonal method or other suitable method to obtain a reconstructed surface. In the system, the plurality of fringes may be sufficient to provide a carrier frequency such that the component x and y fringes are distinguished with high fidelity in the Fourier domain. In the system, the at least three phase shifts may be or comprise red ($\Delta\phi=0$), green $\Delta\phi=\pi/3$, and blue $\Delta\phi=2\pi/3$. The geometry of the system may be configured to be adjustable either by tilting or translating the display screen and the imaging device (e.g., camera) until a good set of measured fringes are obtained, to remove ambiguity in the Fourier domain and/or prevent issues with indistinguishable fringe direction. In preferred aspects of the system, no information is eliminated from the raw measurement data during the Fourier domain processing. The system may be further configured to: compute a difference between a conventional phase shifting measurement and the instantaneous measurement for a common nominal state to provide a difference map; and apply the difference map as a correction in a surface height domain of a dynamic data set to remove spatial frequency errors.

Additional aspects provide a non-contact instantaneous phase mapping deflectometry method to measure a surface, comprising: positioning a display proximate a first side of the surface to be measured; generating a multiplexed pattern for display on the display, the multiplexed display pattern comprising, in each of two orthogonal directions, at least three fringe patterns, each fringe pattern comprising a plurality of fringes sufficient to provide a carrier frequency and each fringe pattern having distinct color-encoded phase shift information to provide a distinctly multiplexed display pattern comprising, in each of two orthogonal directions, a phase-shifted multiplexed fringe pattern having distinct color-encoded phase shift information; generating an input image of at least a portion of the phase-shifted multiplexed fringe pattern after interaction with the surface to obtain at least three respective sets of data corresponding to the at least three color-encoded phase shifts to provide at least three phase-shifted images; analyzing the at least three phase-shifted images by Fourier transform to provide distinct peaks in the Fourier domain at the locations corresponding to the carrier frequencies of the display fringes in the x and y directions; filtering or masking to isolate only the x or y frequency to decompose each of the at least three phase-shifted images into two separate one-directional fringe images; and applying an inverse Fourier transform to the filtered data to reconstruct the one-directional fringe patterns that made up the input image to provide, based on a single input image, at least six unique outputs corresponding to the at least three phase shift fringe patters in both orthogonal directions required for reconstruction of the surface under test. In preferred method aspects, no information is eliminated from the raw measurement data during the Fourier domain processing. In the method, generating an input image of at least a portion of the phase-shifted multiplexed fringe pattern after interaction with the surface to obtain at least three respective sets of data corresponding to the at least three color-encoded phase shifts to provide at least three phase-shifted images, may comprise use of an imaging device having at least three separately readable color channels. The method may further comprise: applying a three-phase step algorithm to each direction to generate four data sets; two wrapped phases and their modulation, one in each direction; unwrapping the phases using a flood fill method or other suitable method, and converting it to slope data given in two directions, x and y, using system geometry parameters; and integrating the slope data using a Southwell zonal method or other suitable method to obtain a reconstructed surface. In the method, the plurality of fringes may be sufficient to provide a carrier frequency such that the component x and y fringes are distinguished with high fidelity in the Fourier domain. In the method, the at least three phase shifts may be, or comprise red ($\Delta\phi=0$), green $\Delta\phi=\pi/3$, and blue $\Delta\phi=2\pi/3$. In the method, the input image may be a distorted version of the display image. In the method, the system geometry may be configured to be adjustable either by tilting or translating the display screen and the imaging device (e.g., camera) until a good set of measured fringes are obtained, to remove ambiguity in the Fourier domain and/or prevent issues with indistinguishable fringe direction. The method may further comprise: computing a difference between a conventional phase shifting measurement and the instantaneous measurement for a common nominal state to provide a difference map; and applying the difference map as a correction in a surface height domain of a dynamic data set to remove spatial frequency errors.

Yet further aspects provide a non-contact instantaneous phase mapping deflectometry method to measure a surface, comprising: displaying, on a display screen, a phase-shifted multiplexed fringe pattern having, in each of two orthogonal directions, distinct color-encoded phase shift information, such that when the screen is placed a known distance in front of a specular surface, the display screen will produce an input pattern reflected from the surface; generating an output image, using an imaging device located proximate the display screen and focused on the surface, to provide slope information in two orthogonal directions based on a single input image comprising at least a portion of the input pattern reflected from the surface; and calculating, using a computing device, the slopes of the surface and integrating the slopes to give the surface topography. In the method, the input image may be a distorted version of the display image. In the method, the phase-shifted multiplexed fringe pattern may comprise, in each of two orthogonal directions, at least three fringe patterns, each fringe pattern comprising a plurality of fringes sufficient to provide a carrier frequency and each fringe pattern having distinct color-encoded phase shift information to provide a distinctly multiplexed display pattern comprising, in each of two orthogonal directions, a phase-shifted multiplexed fringe pattern having distinct color-encoded phase shift information. In the method, the imaging device may be positioned to detect the input image, and to generate an electronic image thereof, the imaging device having at least three separately readable color channels to obtain at least three respective sets of data corresponding to the at least three phase shifts to provide at least three phase-shifted images. In the method, the system may be configured to analyze each of the at least three phase-shifted images by Fourier transform to provide distinct peaks in the Fourier domain at the locations corresponding to the carrier frequencies of the display fringes in the x and y directions, the system configured to apply filters or masks that isolate only the x or y frequency to decompose each of the at least three phase-shifted images into two separate one-directional fringe images, the system configured to apply an inverse Fourier transform to the filtered data to reconstruct the one-directional fringe patterns that made up the input image to provide, based on a single input image, at least six unique outputs corresponding to the at least three phase shift fringe patters in both orthogonal directions required for reconstruction of the surface under test. The methods may further comprise: applying a three-phase step algorithm to each direction to generate four data sets; two wrapped phases and their modulation, one in each direction; unwrapping the phases using a flood fill method or other suitable method, and converting it to slope data given in two directions, x and y, using system geometry parameters; and integrating the slope data using a Southwell zonal method or other suitable method to obtain a reconstructed surface. In the method, the plurality of fringes may be sufficient to provide a carrier frequency such that the component x and y fringes are distinguished with high fidelity in the Fourier domain. In the method, the at least three phase shifts may be, or comprise red ($\Delta\phi=0$), green $\Delta\phi=\pi/3$, and blue $\Delta\phi=2\pi/3$. In the method, the system geometry may be configured to be adjustable either by tilting or translating the display screen and imaging device until a good set of measured fringes are obtained, to remove ambiguity in the Fourier domain and/or prevent issues with indistinguishable fringe direction. In preferred method aspects, no information is eliminated from the raw measurement data during the Fourier domain processing. The method may further comprise: computing a difference between a conventional phase shifting measurement and the instantaneous measurement for a common nominal state to provide a difference map; and applying the difference map as a correction in a surface height domain of a dynamic data set to remove spatial frequency errors.

Experimental data showing the capabilities of the instantaneous phase mapping deflectometry system are provided. In an exemplary mobile device embodiment, an instantaneous snapshot phase mapping deflectometry measurement method was physically realized by implementing it on an iPhone 6® device and measuring a deformable mirror as it changed in real time. To do this, the required information for a deflectometry measurement was multiplexed into a single display image, and then exciting techniques were used to distinguish/reconstruct each piece with good quality.

A quantitative comparison of a different category of deflectometry that leverages Fourier Transform Profilometry (FTP) with an interferometric method is presented, highlighting the ambiguities associated with the FTP deflectometry.

The presently disclosed instantaneous methods are surprisingly effective given the likely sources of error and hardware limitations as appreciated in the prior art (Butel, G. P., et al., Opt. Eng. 54(12), 025111 (2015))

The present invention is surprisingly effective in view of likely sources of error appreciated in the prior art that would have contraindicated the present invention. This is, such sources of error, not only include those that would be expected to be common to all deflectometry systems (e.g., screen deformations that distort the displayed pattern causing a systematic error, and camera or screen nonlinear response causing print through), but those that would be unique to implementation of an instantaneous method as presently disclosed. For example, any attempt at multiplexing using color coding, as in Applicants' instantaneous measurement, would have been expected to suffer from unique sources of error from cross-talk between color channels in the screen and the camera. On the screen, as would have been appreciated in the art, the spectral output from a single color pixel is fairly wide such that it overlaps with the other channels. The camera's pixels are also not perfectly filtered, so displaying a single color will cause a response in all three detector color channels. The cross-talk between color channels would be expected to cause the phases to print through onto the other phases, creating distortions in the measured phase shifted images. This, in turn, would have been expected to affect the system's instrument transfer function (ITF), or how the system responds to a given input. Moreover, by using a color display and detector, alteration of the ITF would be expected because the individual color filtered pixels are made into a larger super pixel. This would translate into a decrease in the spatial resolution related performance (or ITF).

However, despite such likely sources of error, the data of FIG. 6 (discussed herein below), shows that the disclosed instantaneous phase mapping deflectometry method provides a precision metrology technique that enables confident dynamic measurement of a surface.

According to particular additional aspects of the present invention, systematic errors for instantaneous phase mapping deflectometry can be carefully calibrated out according to a target metrology accuracy and precision depending on the method's specific application. For example, the difference between the three phase and instantaneous measurement results can be used to apply an advanced calibration for the color cross-talk errors. Alternatively, a specialized detector with better color filters is fabricated and used. In additional aspects, understanding the chromatic aberrations and color transmission function of the camera lens improves the accuracy of the system. For example, the screen filters could also be improved to give better display color discrimination, and in such case the output from each color pixel would then only register on the corresponding colored detector pixel. Therefore, such systematic sources of error are not, in fact, a fundamental limit to the method, but rather reflect particular hardware limitations that can be improved by hardware upgrades.

BRIEF DESCRIPTION OF THE DRAWINGS

FIG. 3a shows a deformable mirror with a 15 mm circular surface that is obscured from view in FIG. 3b. The upper arrows in FIG. 3b approximate the time-reversed paths of the rays from the front-facing camera of an iPhone® reflected off the mirror's surface and striking the iPhone's screen, similar to those shown in FIG. 1. A deformable mirror is shown on the left of FIG. 3b, and an iPhone® in its mount is shown on the right.

are the measured surface maps for all three methods, shown in (b) are the difference maps between the labeled methods, and (c) is the line profile data for all three methods corresponding to the black dashed line in (a). Note that PV is the peak-to-valley distance.

Figures 7A, 7B, 7C:
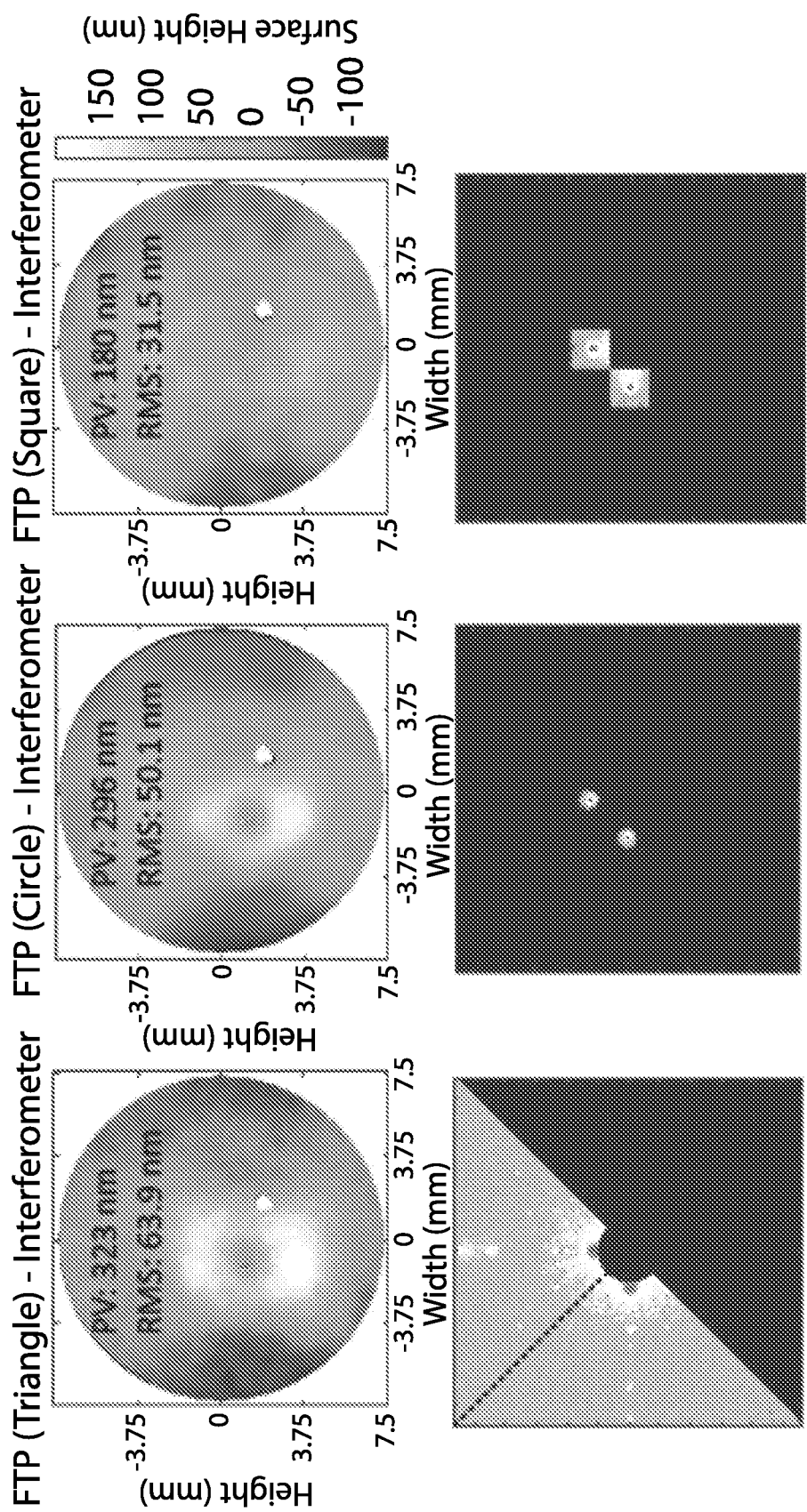

FIGS. 7(a), (b) and (c) show, according to particular exemplary embodiments, difference maps between FTP method and interferometric method of measuring a surface. The bottom row of masks shows the large possibility of defining the Fourier domain filter shape, which results in uncertainties in the reconstructed surface maps in the top row.

Figures 8A, 8B, 8C:
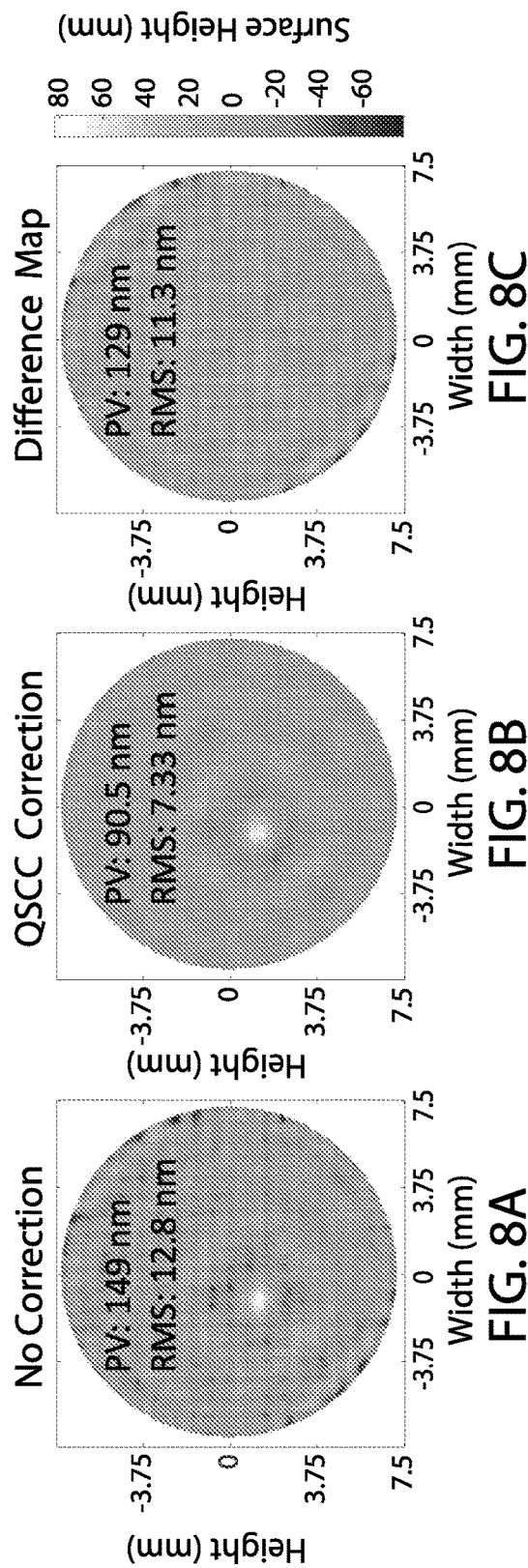

FIGS. 8(a) and (b) show, according to particular exemplary embodiments, residual surface after removing Zernike terms 1-100 from before and after, respectively, the Quasi-Static Common Configuration correction (QSCC) as an advanced calibration. The instantaneous measurement brings about new sources of error, so the correction method must account for them. The difference between the maps is shown in (c) to highlight the significance of this error correction method.

FIG. 9 shows, according to particular exemplary embodiments, raw images collected at various states within the single actuator's motion. The image in (a) is the nominal state, (b) is at approximately half stroke of the actuator, and (c) is at the maximum deviation of the single actuator. On the order of half a fringe of deviation of the measured patterns was observed between (a) and (c), showing the range over which we have tested the QSCC correction method.

FIGS. 10a-d show, according to particular exemplary embodiments, measured surfaces of a deformable mirror used to investigate the DM's linearity along with a link to the full video file from which the surface data was taken. (a) Zernike coefficient Z5: http://dx.doi.org/10.1117/12.2272188 (b) Zernike coefficient Z12 (c) Zernike coefficients Z5 and Z12 simultaneously and (d) Sum of the results in (a) and (b). Note the discrepancy between (c) and (d), either due to the deformable mirror's inability to linearly combine the Zernike surfaces or mistiming between the measurements. Also note that all figures are plotted on the same scale.

FIGS. 11a and 11b show, according to particular exemplary embodiments, value of the specified Zernike coefficient (RMS contribution) as a function of time showing the linearity of the deformable mirror. The Zernike terms were fit to the measured surface data in two cases. First, when the deformable mirror's surface was a combination of Z5 and Z12 (blue) and second, the sum of the individual surface data from the Z5 and Z12 cases (red). A good agreement was observed between the sum and simultaneously generated surfaces, showing that the deformable mirror is a linear system for this combination of Zernike terms.

Figures 12A, 12B:
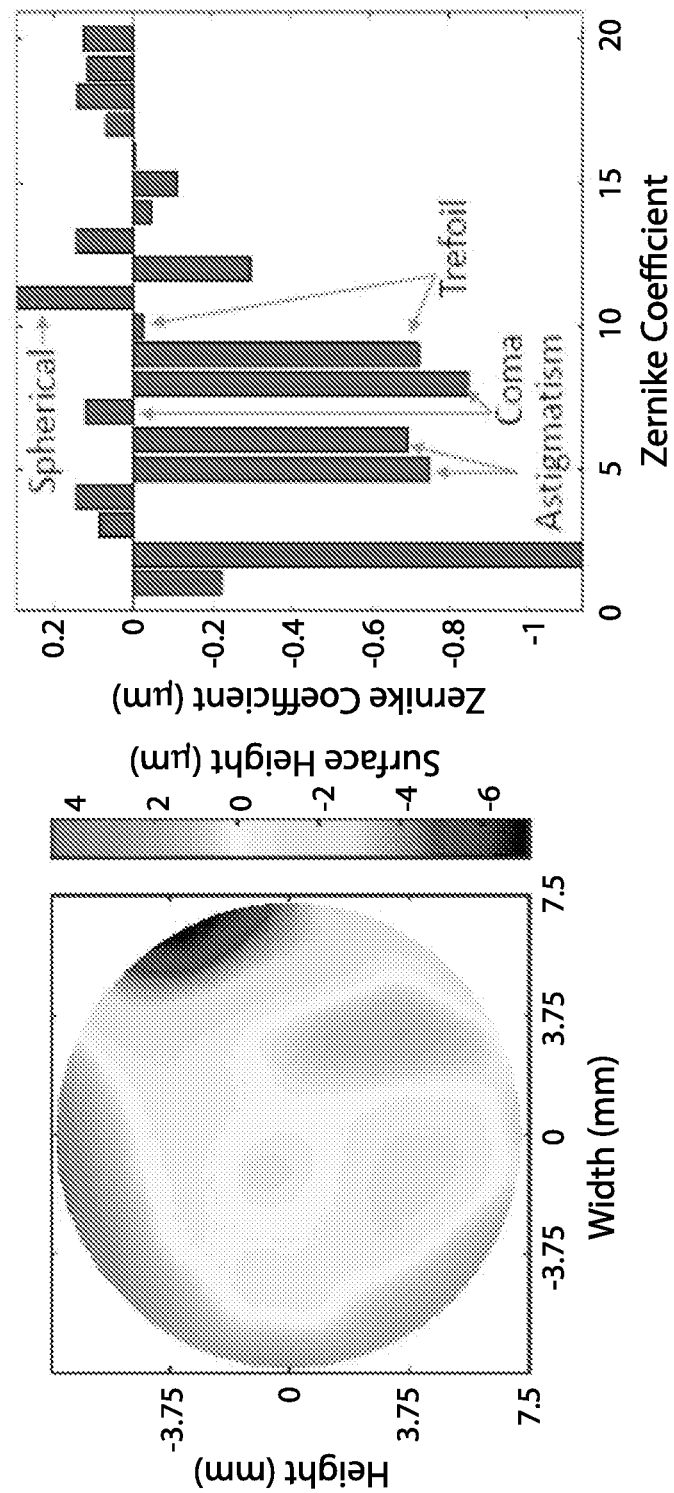

FIGS. 12a and 12b show, according to particular exemplary embodiments, measurement of a many-termed Zernike surface generated by the DM, where FIG. 12a is the surface reconstruction at the point of maximum surface deviation from nominal, and FIG. 12b shows a Zernike mode histogram contributing to the measured surface. Up to Z20 was fit to analyze the surface.

DETAILED DESCRIPTION OF THE INVENTION

Figure 1A:
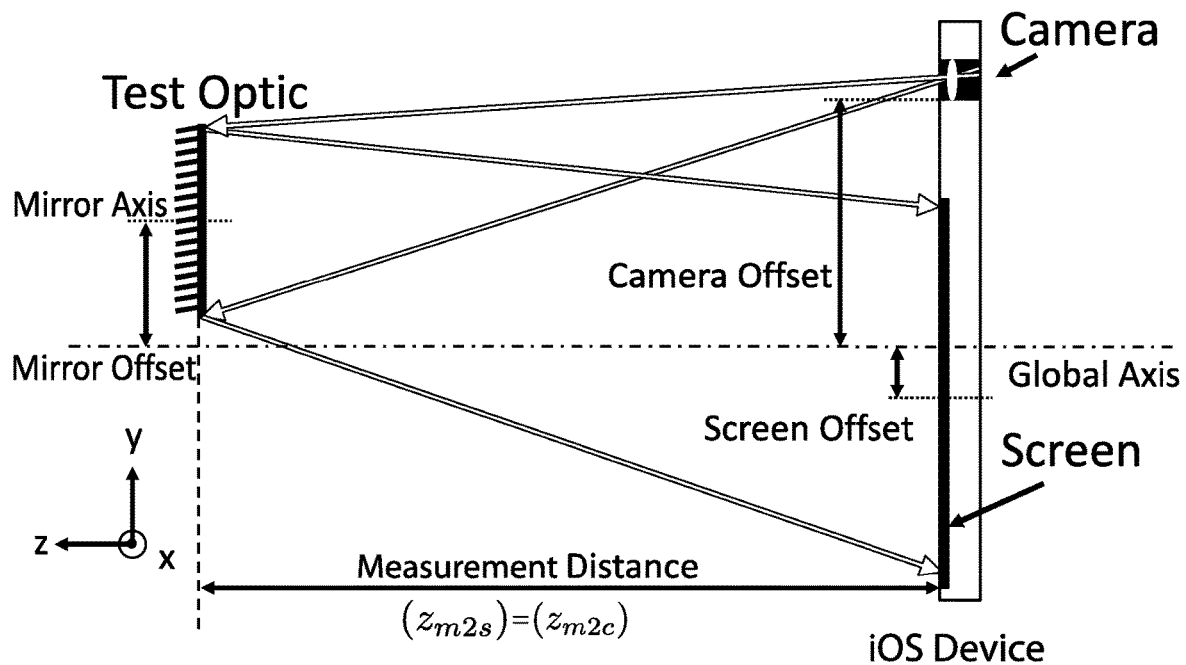
FIGS. 1(a) and (b) show, according to particular exemplary embodiments, schematics of a typical deflectometry measurement with all relevant distances indicate for use with a mobile phone (a) or more generally (b). Relative to FIG. 1(b), in FIG. 1(a), Zm2s=Zm2c
Figure 1B:
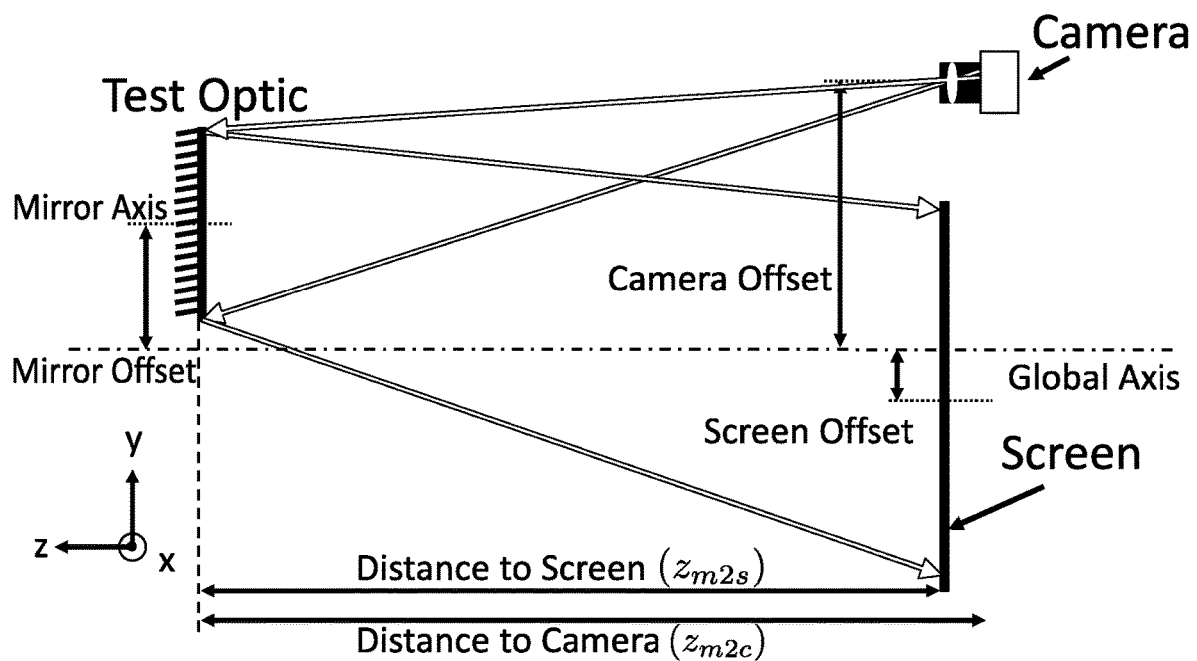

Deflectometry is a surface slope measuring tool that requires minimal hardware and acquires surface height data with nanometer-level precision. It directly measures slope data, and has a very large dynamic range (Su, P., et al., Proc. SPIE 8450, 1{9 (2012)). At the most basic level, a deflectometry system must have a screen to display a pattern, and a camera to capture images of the mirror under test, which is illuminated by the screen. A schematic of the measurement setup is shown in FIG. 1. The camera hardware can be chosen from off-the-shelf components where low signal-to-noise and fast acquisition times are desirable. The screens can also be off-the-shelf, but the patterns displayed are areas of active research. The camera is positioned such that it focuses on the mirror's surface while close to the center of curvature of the optic. For a flat mirror, as shown in FIG. 1, the axial location is primarily determined by sampling criteria. In practice, the camera must be shifted off-axis in order to collect light from the screen that is reflected off of the test optic. It is therefore helpful to conceptualize the geometry by tracing rays from the camera to the screen to determine where they intersect the mirror and screen. The camera acts as an eye, and each pixel on its detector will correspond to a point on the mirror and screen. These three points in 3D space, across the entire optic's surface, define the knowledge required to perform a measurement. This should thought of as a mapping between the camera and screen caused by the optic.

To create a mapping, current deflectometry systems use display patterns such as line-scanning, binary patterns, and phase shifting (Butel, G., et al., Proc. SPIE 8493, 1-12 (2012)). The general process of creating a mapping using the phase of a pattern is defined as Phase Mapping Deflectometry (PMD). This encompasses and generalizes the well-established Phase Shifting Deflectometry (PSD) systems while providing a more accurate naming convention. A phase shifting approach is utilized in the presently disclosed work. For example, to acquire the slope data, a sinusoidal pattern is first displayed across the screen of a fixed frequency by modulating the output brightness of individual pixels. The pattern is then shifted by a fixed phase shift until a full $2\pi$ phase shift is completed. This pattern is displayed in both x and y directions separately from one another. After collecting the images corresponding to the phase shifted display pattern, a phase shifting algorithm (Malacara, Z. and Servin, M., "Interferogram analysis for optical testing", vol. 84, CRC press (2016)) is applied to obtain wrapped mapping data. The wrapped mapping is unwrapped using typical methods found in interferometry (Asundi, A. and Wensen, Z., "Fast phase-unwrapping algorithm based on a gray-scale mask and flood fill," Applied optics 37(23), 5416-5420 (1998)) which results in the final mapping between the camera and screen through the surface under test. A slope calculation, given by Equation 1, is then performed to obtain the local slope at every sample point across the surface. Note that Equation 1 is for the x-direction slopes, while the y-slopes are computed using the same form of equation, but with the corresponding y-direction variables.

$$s_x = 1/2[(x_m - x_s)/z_{m2s} + (x_m - x_c)/z_{m2c}],$$

where $s_x$ is the local slope, $x_m$ is the local mirror surface coordinate, $x_s$ is the screen pixel coordinate, $x_c$ is the camera pixel coordinate, $z_{m2s}$ is the distance from the mirror to the screen, and $z_{m2c}$ is the distance from the mirror to the camera. The slope data is then integrated to obtain surface height information, which is accomplished either by using a pixel-by-pixel (zonal) method or by fitting with analytic functions (modal).

The instantaneous phase mapping deflectometry measurement method disclosed for the first time herein is fundamentally different from prior art deflectometry methods because it does not multiplex information in the time domain. The theory supporting the present instantaneous phase-shifting measurement does not impose any restrictions on how fast a measurement can be made, whereas prior art time-multiplexed measurements must occupy a finite extent in time. As disclosed and shown herein, in application, this means that the present instantaneous phase mapping deflectometry can measure objects in turbulent environments, high vibration situations, or even surfaces that are controlled via a feedback loop. The disclosed instantaneous phase mapping deflectometry measurement also addresses situations that prior art interferometer technology cannot; for example, the presently disclosed instantaneous phase mapping deflectometry method provides for measuring the dynamic bending modes of a large optic (e.g., large freeform/aspheric optic) with active control, whereas previously, the large phase variations in the environment and/or the required large dynamic range of the freeform metrology prevented such a result.

Applicants created and herein disclose an instantaneous phase-mapping style of deflectometry, as opposed to leveraging common FTP techniques, because of the great potential for this new form of instantaneous deflectometry measurement. According to the present conceptions, the phase shifting style of deflectometry has been fundamentally improved by multiplexing the required information into a single display pattern to make it an instantaneous measurement. According to additional aspects, phase shifting deflectometry was selected because it provides high accuracy data from a small number of images compared to line-scanning or binary patterns. Moreover, phase mapping deflectometry is insensitive to spatial light variations on the screen, while it is affected by (sensitive to) temporal variations, making it an excellent approach for the present instantaneous measurement process. FTP was also considered as a technique because it has been shown to work as an efficient instantaneous solution using only a single fringe image instead of multiple phase shifted images, however it was not selected due to the potential uncertainty in measurements and the Fourier domain processing challenges, which are discussed and detailed herein below.

The disclosed method of multiplexing incorporates two main ideas, each with an analogous concept in the realm of instantaneous interferometry. First, the phase information is encoded (registered) using color, which requires a color display and camera. This style of registration is similar to that employed by the polarization multiplexed interferometer, where each phase shift is detected independently from the others. The number of color channels is fixed by the hardware, so in an exemplary embodiment, a three-step phase shifting algorithm was used, the minimum required. Second, a large number of fringes are displayed on the screen, which acts as a carrier frequency function in the image, similar to the spatial frequency carrier interferometer. By combining both of these concepts, six pieces of information are distinctly multiplexed; corresponding to the three phase shifts in the two orthogonal directions necessary for a phase shifted deflectometry measurement. It is important to note that the analogies given here are only meant to provide an intuition into the multiplexing methods for those more familiar with interferometry. The comparison should not be understood as implying that the interferometry methods are the same as the deflectometry methods because the two metrology systems operate on fundamentally different principles.

While the two orthogonal directions of the fringes can be defined in any direction, for convenience, the two orthogonal directions of the fringes are defined to be in the x and y directions (best for displaying fringes accurately on commercial screens), which lie in the plane of the screen as shown in FIGS. 1 (a) and (b). The x and y fringe data are displayed simultaneously, resulting in a pattern that looks more like an oscillating membrane than fringes. Furthermore, each phase shift is superimposed, so the resulting display is a multicolored membrane that does not resemble traditional fringes. This multiplexed pattern (phase-shifted multiplexed fringe pattern having distinct color-encoded phase shift information; display image) is shown at the start of the data flow chart given in FIG. 2, and labeled as "Display Image".

Figure 2:
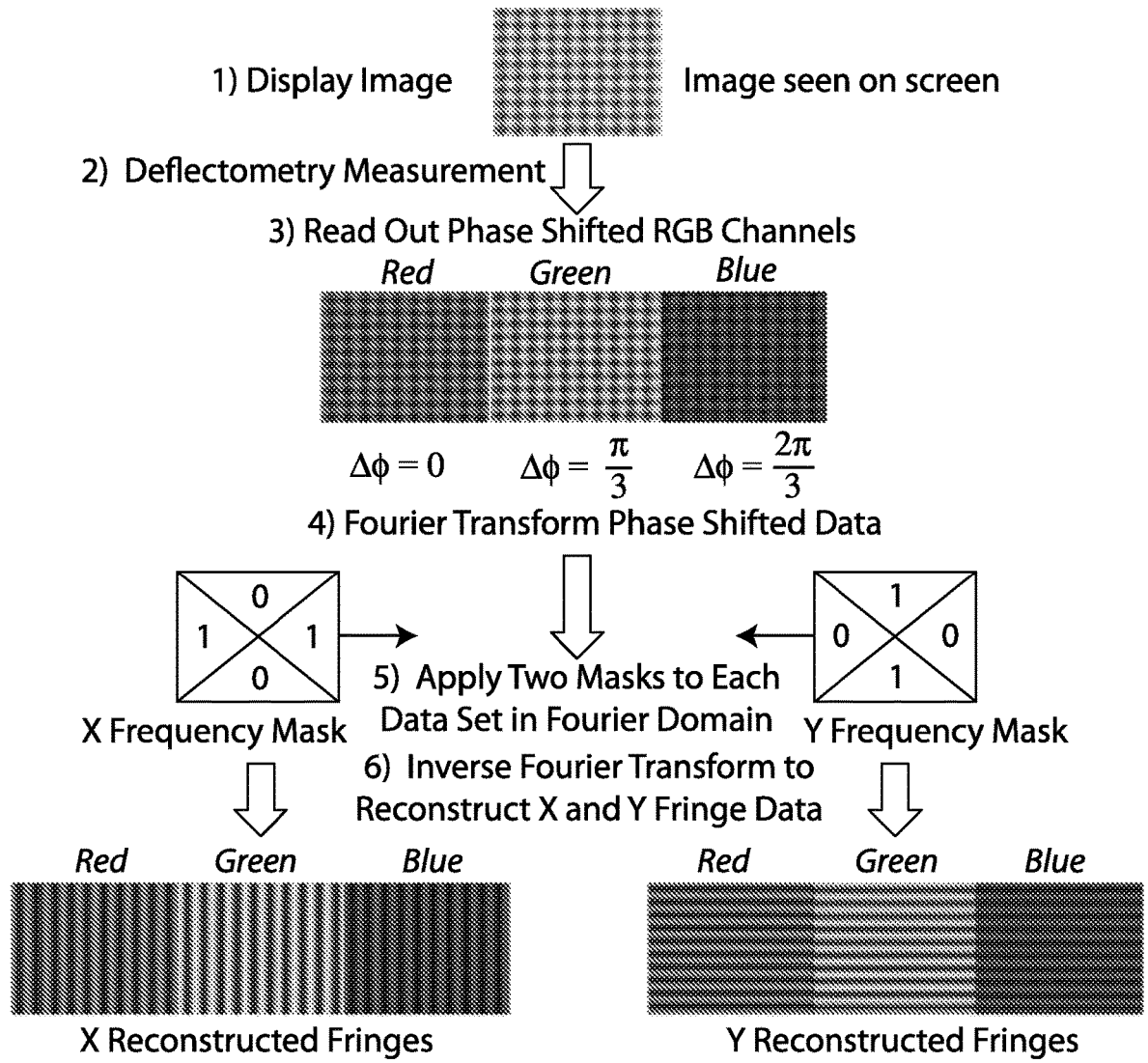
FIG. 2 shows, according to particular exemplary embodiments, an overview (images shown are all synthetically generated with MATLAB®) of the incorporation of Applicants' new concepts into an instantaneous phase mapping deflectometry measurement process. Not shown, after the last step shown, are further data processing steps (e.g., phase unwrapping and integration steps) that are not unique to the instantaneous measurement.

With reference to FIG. 2, the camera in this embodiment (FIG. 1) captures an image (camera input image) of the surface under test, which is illuminated by the screen, and the resulting image is a distorted (e.g., irregular-spaced display pattern) version of the display image (e.g., regular-spaced display pattern). The camera of this embodiment has three color channels which are read out separately to obtain three sets of data, corresponding to the three phase shifts: red ($\Delta\phi=0$), green $\Delta\phi=\pi/3$, and blue $\Delta\phi=2\pi/3$. Each phase shifted image is then Fourier transformed. In the Fourier domain, distinct peaks are observed at the locations corresponding to the carrier frequencies of the display fringes in the x and y directions. By dividing the Fourier domain into x and y frequencies without rejecting any information, the input image is decomposed into two separate images that would have been observed had one-directional fringes been displayed. Note that this is fundamentally different from the FTP method, where a portion of the frequency information that contains some true information is discarded during data processing.

The separation boundaries applied to the frequency data in instantaneous phase mapping deflectometry are shown in FIG. 2 labeled as 'X Frequency Mask', and 'Y Frequency Mask'. Alternatively, they are referred to as bow tie and hour glass filters, respectively, due to their shape. In practice, due to discrete sampling, the edge boundary is actually jagged, but in an analytic case it would be smooth. Also, the center pixel (zero frequency) is used in both masks to preserve the mean intensity value. The masks separate out a single frequency direction, while preserving the details of the fringe pattern contained in each frequency direction. They work on the principle that with a large enough carrier frequency in the display membrane, or a dense fringe pattern, the component x and y fringes are distinguished with high fidelity in the Fourier domain. We note that certain surface profiles will result in a measured fringe patterns that have closed loop fringes (Su, T., et al., *Appl. Opt.* 52(29) 7117-7126 (2013)), which generate an ambiguity in the Fourier domain. To prevent issues with indistinguishable fringe direction, the geometry of the system is adjusted either by tilting, or by translating the screen until a good set of measured fringes are obtained.

An inverse Fourier transform is then applied to the separated data and the one-directional fringe patterns that made up the input image are reconstructed. From the single input image, six unique outputs are obtained that comprise the three phase shifts in both orthogonal directions required to reconstruct the surface under test.

From this point on, data processing methods that have been developed for the other deflectometry systems are used because there is no difference in data. For completeness, the methods used to reach the final reconstructed surface are covered. First, a three phase step algorithm is applied to each direction, resulting in four data arrays; namely two wrapped phases and their modulation, one in each direction. The phases are unwrapped using a flood fill method (Asundi & Wensen, *Appl. Opt.* 37(23), 5416-5420 (1998)), and converted to slope data with the system geometry parameters. Slope data is given in two directions, x and y, which are then integrated using a Southwell zonal method (W. H. Southwell, *J. Opt. Soc. Am.* 70(8), 998-1006 (1980)) to obtain a reconstructed surface. Further masking or processing with the surface may be done for specific applications.

By way of summarizing some of the fundamental differences of the instantaneous phase mapping deflectometry from other instantaneous measurement methods (differences between Applicants' instantaneous phase mapping deflectometry, and instantaneous interferometry, and instantaneous Fourier transform deflectometry), the following summary is provided.

Interferometry vs. Phase Mapping Deflectometry:

a. Fundamentally different measurement. Interferometry measures surface height while Deflectometry measures surface slope (then integrates to get surface height).

b. Uses different physical phenomenon to make measurements. Interferometry uses the interference of coherent light to capture the optical path difference (OPD) between a reference length and the length of interest. This OPD manifests itself in the phase of the electromagnetic wave, which is observed when two beams interfere. Deflectometry creates a mapping that describes how individual rays of light were changed by the optic's surface, and uses this 3D geometry to calculate the surface slope. The mapping is called a "phase" because the math used to create the map in phase shifting deflectometry is analogous to what has been used in phase shifting interferometry. Thus, the terminology is kept consistent to make the theory more tractable.

c. References concerning interferometry and a few differences between measurement capabilities of deflectometry and interferometry are disclosed herein.

Fourier Transform vs. Phase Mapping:

a. Fundamentally different because they use different mathematical theory to calculate the surface slope. Instantaneous phase mapping deflectometry creates mapping using phase shifting, while they use a Fourier transform.

b. Background information on Fourier Transform Profilometry (FTP), which is the underlying theory used in the Fourier transform deflectometry measurement is provided herein.

c. Details the differences between the presently disclosed use and FTP's use of the Fourier transform are provided herein. Instantaneous phase mapping deflectometry does not throw out any information while FTP must. Instantaneous phase mapping deflectometry uses FT to separate frequencies while FTP uses it to mask, which causes well-known problems when applying an inverse FT.

d. Details comparing the precision that each method can achieve, and highlighting how the differences in the theory behind each method manifest themselves in measurement capabilities are discussed herein.

Example 1

(A Deformable Mirror was Used to Generate Static and Time Varying Surface Shapes (which are Independently Verifiable) that were Measured with the Disclosed Instantaneous Phase Mapping Deflectometry System)

Overview. To validate the concepts presented above, a DM produced by ALPAO was tested on its ability to linearly combine Zernike terms when creating a time varying surface. A deformable mirror was used to generate static and time varying surface shapes (which are independently verifiable) and measured them with the instantaneous phase mapping deflectometry system. Both single snapshots and dynamic measurements are presented. Additionally, the measurement results were quantitatively compared to data from a conventional phase shifting deflectometry system and to a Zygo Verifire® interferometer. In a following section/example, the instantaneous FTP method was compared with the interferometer to highlight the key differences that separate and distinguish the instantaneous phase mapping deflectometry from the instantaneous FTP approach.

Experimental set up. The geometry of the deflectometry system used to make the measurements discussed above is shown in FIG. 3, where an iPhone® was secured in a 1" optic mount using a custom 3D printed case. A commercially available deformable mirror produced by ALPAO was used to generate the surface under test. The mirror's specifications are given in Table 1:

TABLE 1

Relevant specifications of the deformable mirror used to generate the surface measured using instantaneous phase shifting deflectometry.

| Model | Pitch | # of Actuators | Diameter | Settling Time (at ±5%) |
|---|---|---|---|---|
| DM52-25 | 2.5 mm | 52 | 15 mm | 2.0 ms |

The iPhone® was placed close to the deformable mirror in order to adequately sample the mirror surface with the camera pixels, and to limit the size of the display pattern to fit within the phone's screen. The deformable mirror is controlled via a MATLAB® program provided by the manufacturer that allows for command of actuators to move continuously throughout their total range of motion.

Figure 4:
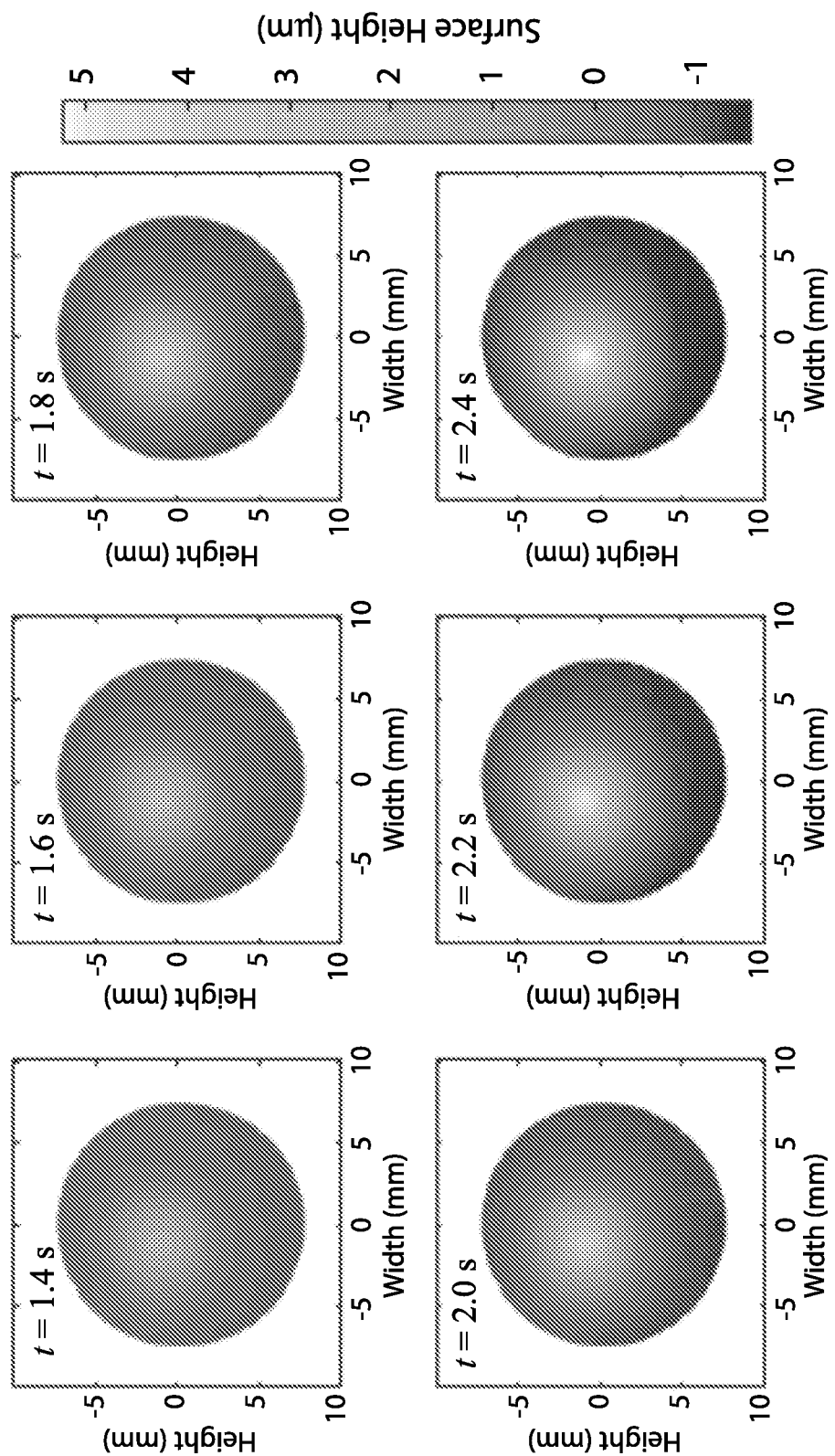
FIG. 4 shows, according to particular exemplary embodiments, application of Applicants' inventive instantaneous phase mapping deflectometry measurement to measure the surface of a deformable mirror (DM) where one actuator was moved by its total stroke. Every other frame was taken from a subsection of the full movie of Visualization 1 to create this series of still images. Frames shown, going from left to right and top to bottom, correspond to: t=1.4 s; t=1.6 s; t=1.8 s; t=2.0 s; t=2.2 s; and t=2.4 s. A baseline measurement was subtracted from the data to show the actuator's influence function.

Results:

Dynamic Metrology Demonstration. To demonstrate the instantaneous phase shifting measurement, the ALPAO deformable mirror was used to create a known time varying surface. A set of fifty uninterrupted measurements were made, taken at approximately 10 Hz, and used to create a movie (Visualization 1 not shown, but representative frames are shown in FIG. 4) of the deformable mirror moving continuously, where a baseline measurement was subtracted from the data in order to measure the influence function of the driven actuator. An influence function is the relative response of an output (e.g. surface height change) due to the change of a unit input (e.g. actuator motion). In Visualization 1, a single actuator in the deformable mirror was moved continuously out and back along its entire stroke, causing a high point on the surface in the region of the actuator. The actuator's dynamic influence function, a critical parameter for calibrating and evaluating a deformable mirror, was therefore measured. The surfaces shown in FIG. 4 are frames taken from Visualization 1. A single high peak is clearly observed in the data, corresponding to the actuator that was commanded to move. This demonstrates the utility and potential applications for an instantaneous measurement where a time varying object needs to be measured, or the object is located in an environment with large vibrations.

Figure 5:
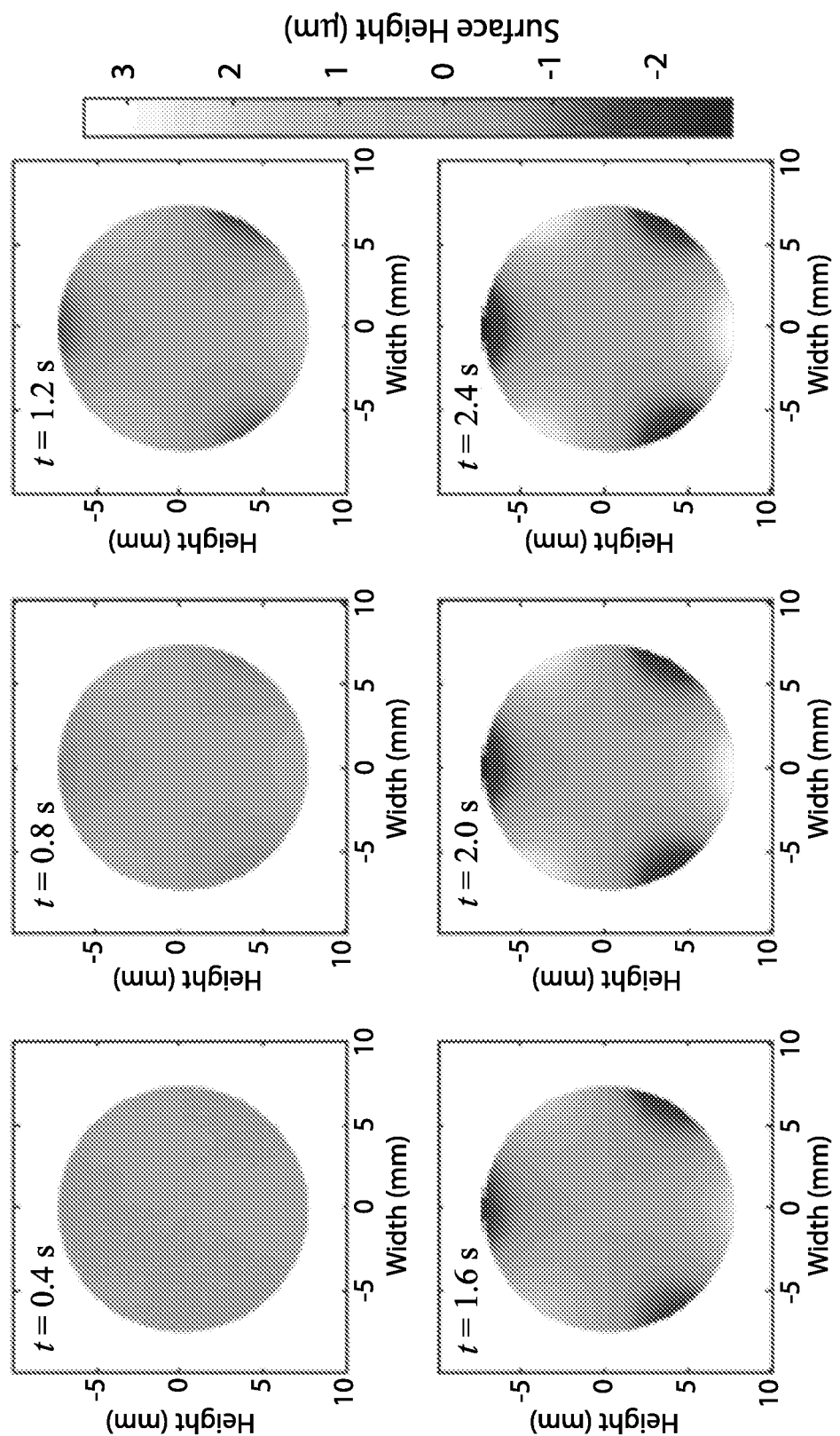
FIG. 5 shows, according to particular exemplary embodiments, application of Applicants' inventive instantaneous phase mapping deflectometry measurement for obtaining measurement data from a Zernike trefoil surface as it moves continuously. Frames shown, going from left to right and top to bottom, correspond to: t=0.4 s; t=0.8 s; t=1.2 s; t=1.6 s; t=2.0 s; and t=2.4 s. The full movie was captured in Visualization 2.

Dynamic Zernike mode measurement. To further highlight the capabilities of the instantaneous measurement, continuously changing Zernike trefoil surface variations were generated on the deformable mirror, starting with a flat, progressing towards maximum deviation, and finally back to a flat surface. The measured surface movie is provided in Visualization 2 (not shown, but a set of six representative frames from the movie are shown in FIG. 5). The lower order shape of the Zernike trefoil is clearly evident across all measurements, showing that the instantaneous method is able to measure not only localized (by single actuator), but also global (low order) surface changes.

Quantitative Measurement Accuracy. The instantaneous measurement was compared to conventional phase shifting deflectometry and to a Zygo Verifire® measurement for an objective accuracy evaluation beyond simply presenting a dynamic result without quantitative investigation.

Figure 6A:
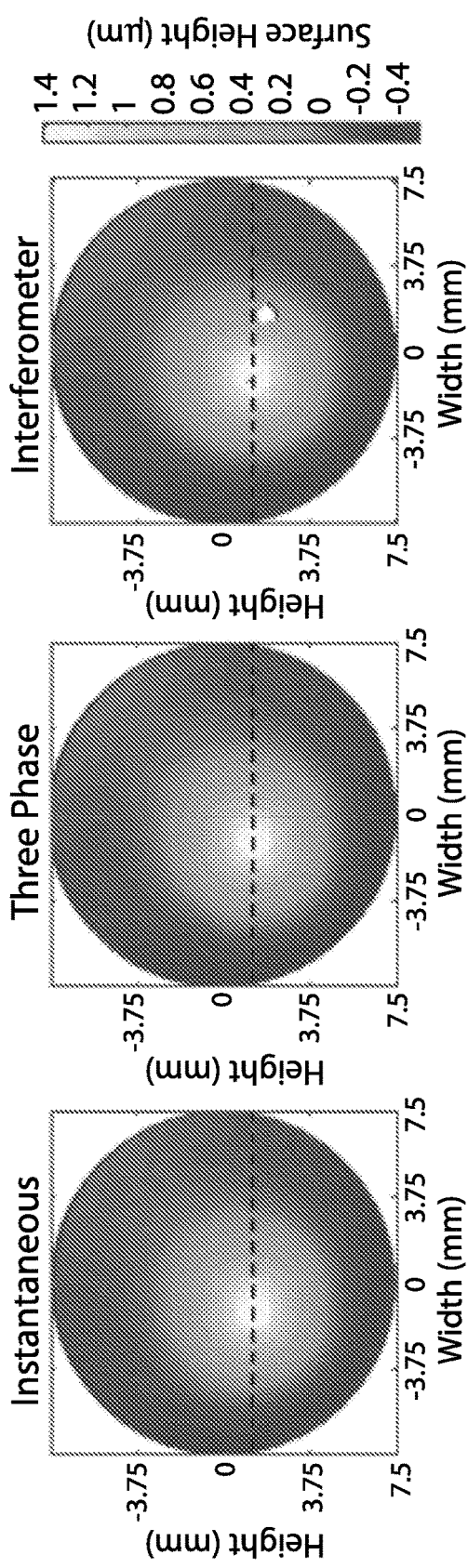
FIGS. 6(a), (b) and (c) show, according to particular exemplary embodiments, comparison between instantaneous phase mapping deflectometry and conventional phase shifting deflectometry methods, and an interferometric method of measuring a surface. Only a small RMS difference is seen between all three methods, showing that the instantaneous method is an accurate tool. The surfaces in (a)
Figure 6C:
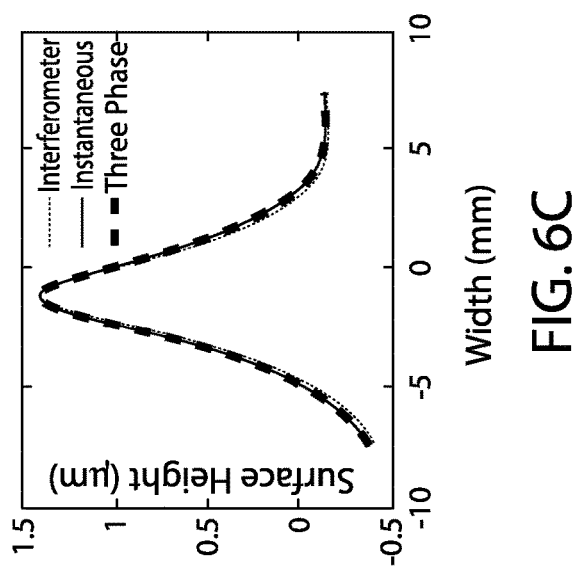
Figure 6B:
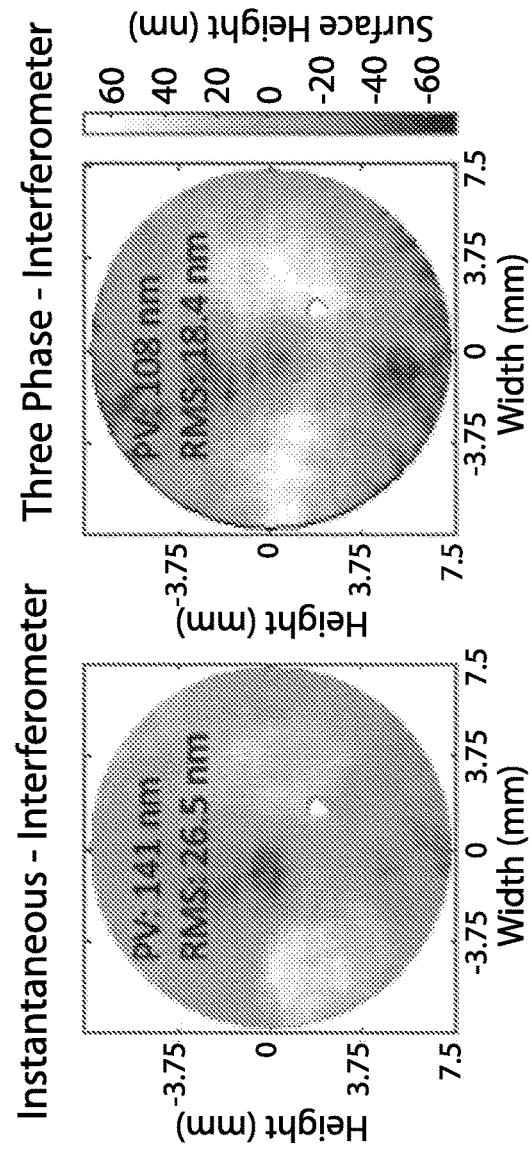

The surface was generated by applying a set voltage to a single actuator in the deformable mirror, similar to one of the frames in FIG. 4 (showing representative frames of Visualization 1). The conventional phase shifting deflectometry measurement was made using the same iPhone® hardware, but with a three step, single color, phase shifting algorithm. A baseline measurement was subtracted from all three data sets to make a fair comparison. The measured surface for the three data sets is shown in FIG. 6(a). Partial data was lost during the interferometric measurement because of a defect in the surface of the deformable mirror. A horizontal line slice was computed through each surface passing across the center of the peak in the data. The line that was evaluated over is shown in FIG. 6(a) as a black dashed line across the width of the surface. Each line slice was plotted on a single axis, which is given in FIG. 6(c). The difference between the surfaces of instantaneous data and the interferometer, as well as between the three phase (conventional phase shifting) and the interferometer measurements were computed. The resulting difference map is shown in FIG. 6(b). Less than 30 nm RMS difference was achieved between all three methods when a feature with about 2 nm peak-to-valley (PV) was measured. This level of agreement demonstrates that the instantaneous phase shifting deflectometry method is an accurate tool, particularly considering an off-the-shelf iPhone® based hardware setup.

Example 2

(The Response of a Deformable Mirror to the Linear Combination of Two Zernike Terms Corresponding to Primary Astigmatism (Z5) and Secondary Astigmatism (Z12) was Examined Using Instantaneous Phase Mapping Deflectometry)

Instantaneous Phase Mapping Deflectometry for Dynamic Deformable Mirror (DM) Characterization Overview. To test the linearity of the DM, a command was input to produce a specific Zernike surface, measuring the surface as a function of time as the input coefficient increases and decreases linearly in magnitude. A second measurement of a different Zernike surface and finally a third measurement of the linear combination of the first two surfaces were then made. With these three data sets, the DM response to the linear combination of two Zernike terms was examined. Zernike terms corresponding to primary astigmatism (Z5) and secondary astigmatism (Z12) were selected for testing (Noll, R. J., "Zernike polynomials and atmospheric turbulence," J. Opt. Soc. Am. 66, 207{211 (March 1976)). This example demonstrates an application for the instantaneous phase mapping deflectometry system implemented on an iPhone®, where a deformable mirror was tested for its linearity when generating Zernike surfaces. In this exemplary case, the capabilities of measuring low-order Zernike surface terms as well as the potential to use as a dynamic calibration tool for the deformable mirror was demonstrated. This characterization and potential calibration of the deformable mirror's surface has applications in, for example, adaptive optics where deformable mirrors are used to correct time varying wavefronts. The instantaneous phase mapping deflectometry system is well suited for relative dynamic metrology such as tracking the change due to environmental conditions or an actively controlled surface.

Calibration and test geometry. The DM was calibrated prior to the experiment using a Shack-Hartmann wavefront sensor (SHWS) in order to provide the software with a look-up table to produce the required Zernike terms. The SHWS was used because it provided a direct method of inputting the calibration data into the DM's software. Note that because this calibration process has its own sources of error, but the DM is not being tested for its ability to produce pure Zernike surfaces, but rather for its ability to produce the linear combination of the surfaces created.

Figure 3A:
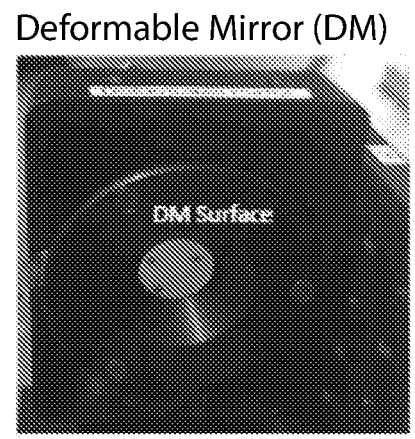
FIGS. 3a and 3b show, according to particular exemplary embodiments, images of an experimental setup featuring an iPhone® and a deformable mirror used to demonstrate utility of the inventive instantaneous phase mapping deflectometry measurement.
Figure 3B:
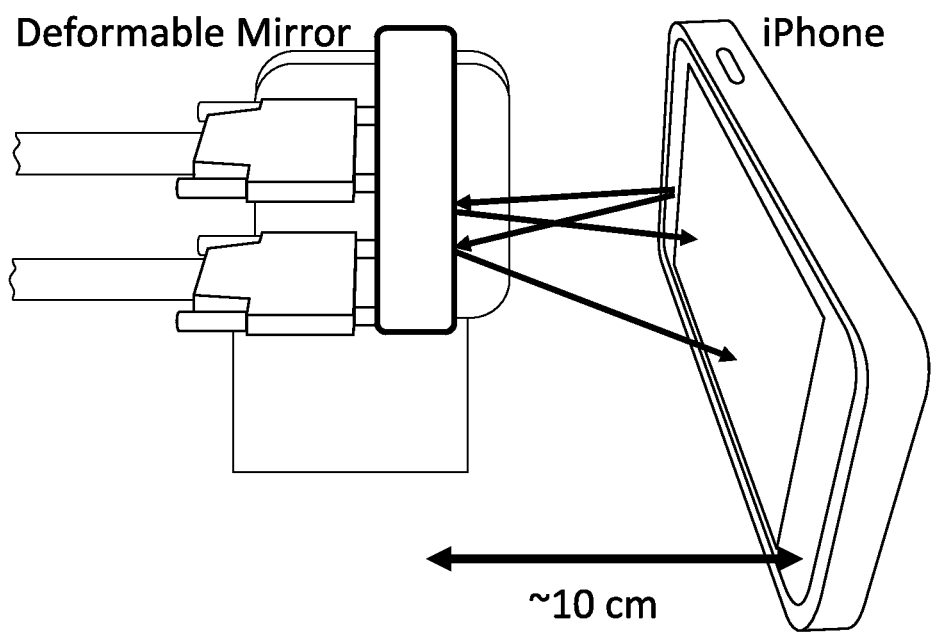

The measurement geometry is as shown in FIG. 3, where the iPhone® is held in a 3D printed mount and placed approximately 10 cm away from the DM's surface. The DM surface was measured at a rate of 10 Hz (limited by how quickly the iPhone® can capture image data and save to a file at its highest resolution settings). A total of 75 sequential images were collected for each experiment, yielding a measurement interval of 7.5 seconds over which the DM was actuated.

Linearity results. The recorded images were processed using the instantaneous scheme depicted in FIG. 2, producing surface height data across the DM's 15 mm circular aperture. The three distinct Zernike surfaces measured are shown in FIG. 10a-c next to the surface (FIG. 10d) showing the synthetic combination of the two individual Zernike surfaces (FIG. 10a-b) to compare against the generated (and measured) combination of the two terms (FIG. 10c). As described previously, the DM's ability to generate the specified Zernike term is not being tested because the calibration procedure using the SHWS is not perfect. Therefore, the non-pure Zernike surfaces shown in FIG. 10a-b are tolerated. A discrepancy is seen between the synthetic linear combination and the measured linear combination due to errors in generating the combination of the Zernike surfaces. However, due to the implementation on the iPhone and controlling the DM via a separate computer, it was not possible to precisely time each measurement, leading to small temporal offsets between the measurements that could also cause differences seen between FIGS. 10c and d. To compensate as much as possible for this effect, each data set from the three experiments was examined and the start of the DM motion was aligned to take place at the same frame in each data set.

By fitting the measured surfaces with Zernike coefficients (standard ordering), it was possible to see how the value of the coefficient (RMS surface contribution) varies as a function of time between the synthetic linear combination and the measured linear combination. A linear change in the coefficient up to a peak or valley (depending on the sign), and then back to its starting value of zero is expected. FIG. 11 shows plots of this behavior corresponding to the two selected Zernike coefficients along with the RMS difference between the measured surface and the synthetically-summed surface. The surfaces have other Zernike terms present, but they are not of concern here because of the calibration of the DM. For each Zernike coefficient, the measured linear combination (blue line) and the synthetic linear combination (red line) was plotted on the same axis for a direct comparison. As shown, there is good agreement for each coefficient throughout the full range of coefficient values resulting in RMS differences of 0.25 µm, and 0.08 µm, for Z5, and Z12, respectively. The large deviation in the Z12 coefficient (FIG. 11b) is most likely the same difference that we see between FIG. 10c-d, where the DM encounters errors generating the linear combination. The change in the coefficient value is also nonlinear for the measured combination while more linear for the synthetic combination, indicating that the DM may generate errors when combining Zernike coefficients. The largest discrepancy between the two data was found at the maximum value of the coefficient (peak or valley), most likely due to the DM reaching its maximum stroke at these locations causing a nonlinear effect. The slope of the change in coefficient is very similar between the two cases, but it is not perfectly linear. This behavior is most likely caused by the errors during calibration with the Shack-Hartman wavefront sensor, but it could also be an issue with the stroke of the DM's actuators.

The capabilities of the deformable mirror was further examined by measuring a surface with eight Zernike modes (Z5, Z6, Z8, Z9, Z11, Z12, Z13, and Z15) multiplexed. This experiment also tested and validated the capabilities of the hardware and software in reconstructing the surface. A typical application of a deformable mirror will utilize a large number of Zernike terms, and therefore it is important that the instantaneous PMD system is sensitive to each term. Shown in FIG. 12(a) is a sample of this measurement, where the surface height change is at its maximum and in FIG. 12(b) is a bar plot of the Zernike term contribution to the surface. A large superposition of Zernike terms was seen, even getting nonzero values in modes that were not set by the deformable mirror's software. This is most likely due to a combination of the imperfect DM calibration with the SHWS and the mode cross-talk by the DM.

In summary of this Example 2, using the instantaneous phase mapping deflectometry technique implemented on an iPhone®, it was possible to perform experiments to test if a deformable mirror is a linear system. The basic principle of a linear system is that the scaled combination of two inputs results in the same output as the post-combination of two individual inputs applied separately and scaled afterwards. The deformable mirror is able to generate Zernike surface modes, which are specified by their coefficient value representing the Root-Mean-Square of the resultant surface in micrometers. The linearity was tested by measuring a surface of pure Z5 (Primary Astigmatism) and then pure Z12 (Secondary Astigmatism), and then a combination of Z5 and Z12. Using the first two measurements, the data post-measurement (synthetic) was combined and compared with that of the direct measurement.

The experimental results show that the deformable mirror is close to a linear system, but there are some errors that can be attributed to the prior calibration of the Zernike surfaces. To further validate the capabilities, a surface of many Zernike modes was created, and the low-order shape change as a function of time was tracked. The results showed that one can now perform calibration or characterization of such a dynamic system, and that the disclosed deflectometry technology is very capable of measuring multiple low-order Zernike modes.

Example 3

(A Comparison of the Present Instantaneous Deflectometry Methods with Fourier Transform Profilometry (FTP) was Performed)

Fourier Transform Profilometry Comparison

Overview. To compare the interferometric method to the instantaneous FTP method, the deformable mirror with a single actuator at the same position as before (as in FIG. 6) was measured, using the reported FTP solution (Huang, L., et al., Opt. Express 19 (13), 12809-12814 (2011)). The difference between these surfaces and the data from the interferometer was computed in the same manner as before. The results of this experiment are shown in FIG. 7, where three different filters (shown below the corresponding difference map) were used to process the same data.

The precise meaning of the filters used in FTP are essentially different from the Fourier process used in the presented instantaneous phase shifting deflectometry. The instantaneous phase mapping method only uses the Fourier domain to separate the frequency information into two categories. The instantaneous phase mapping deflectometry method does not eliminate a single piece of information from the raw measurement data during the Fourier domain processing as discussed above. However, the FTP method must reject or select some frequency information in order to reconstruct the phase data. The surface reconstruction is very sensitive to the exact form of this filtering operation, which leads to uncertainties affecting the accuracy of the measurement. This is why a good number of papers about the best filtering method have been published (L. Huang et. al., Opt. and Lasers in Eng. 48, 141-148 (2009); Q. Kemao, Opt. and Lasers in Eng. 45, 304-317 (2007); and Q. Kemao, Appl. Opt. 43 (13), 2695-2702 (2004)). Also, the most recent FTP-based instantaneous results were not quantitatively and experimentally cross-confirmed against other reference technologies such as an interferometer (Y. Wu et. al., Opt. Eng. 55(22), 024104 (2016); and Huang, L., et al., Opt. Express 19 (13), 12809-12814 (2011)). Implementing these methods is not an easy task, and there is no single best solution since there are an infinite (or as many as the number of pixels in the Fourier domain) number of possible filtering mask shape parameters.

Applicants' results shown in FIG. 7 demonstrate the uncertainty in reconstructed surface shape caused by using the FTP method due to the filtering process. For instance, as the mask shape is changed from (a) to (b) to (c), the residual RMS error, with respect to the interferometer, changes from 64 to 50 to 32 nm, respectively. The shape of the error also varies significantly with each new Fourier filter. Such a significant difference in performance without good guidelines for choosing the optimal masking shape leads to uncertainties in the accuracy of the reconstructed surface. The goal of this investigation, however, is more than just the absolute value of the residual RMS errors and the error shape variations, and it seeks to call to attention the difficulties in the filtering employed by FTP.

One of the biggest challenges in a FTP method is making a decision in the Fourier domain to accept or reject frequency data when all the deflected pattern image information is interlaced. While there may be a case-specific mask that generates a correct surface shape with a similar residual error to that of the phase shifting method, due to the high sensitivity of the reconstruction process using different filters, the FTP method suffers greatly from the masking ambiguity. By contrast, the presently disclosed phase shifting instantaneous deflectometry method does not suffer from such inexactness because the entire frequency domain information is used. In other words, there is no arbitrary or weakly justified user determined parameter that impacts the accuracy of the final result. It is also important, however, to state that a FTP method (especially one that does not use color-multiplexing [Huang, L., et al., Opt. Express 19 (13), 12809-12814 (2011))]) can achieve higher spatial resolution as it does not require a color display and camera. Therefore, while the FTP method is still a capable and valuable approach, it has different strengths and weaknesses compared to the proposed instantaneous phase shifting method because it utilizes fundamentally different phase measuring methods.

Example 4

Quasi-Static Common Configuration Error Correction

Quasi-Static Common Configuration Error Correction
Overview. The errors contributing to the data shown in FIG. 6 can be broken into two main categories: those that are common to all deflectometry systems, and those that are unique to the presently disclosed instantaneous method.

Errors common to all deflectometry systems include screen deformations that distort the displayed pattern causing a systematic error, and camera or screen nonlinear response causing print-through.

An instantaneous phase shifting measurement also has unique sources of error that come from the cross-talk between color channels in the screen and the camera, color related non-linearity issues, and the physical layout of the screen and camera pixels that cause inexact phase shifts. On the screen, the spectral output from a single color pixel is fairly wide such that it overlaps with the other channels. The camera's pixels are also not perfectly filtered, so displaying a single color will cause a response in all three detector color channels. The cross-talk between color channels causes the phases to print through onto the other phases, creating distortions in the measured phase shifted images. This affects the system's instrument transfer function (ITF), or how the system responds to a given input. By using a color display and detector, we also alter the ITF because the individual color filtered pixels are made into a larger super pixel. This means that we have a decrease in the spatial resolution related performance (or ITF) but gain the instantaneous capability.

While well-known calibration methods can be applied to correct the common deflectometry errors associated with the traditional phase shifting approaches (Su, P., et al., oe20 11 (2012); and Faber, C., et al., Proc. SPIE 8493 84930R (2012)), an advanced data correction that we have termed 'Quasi-Static Common Configuration' (QSCC) compensation was developed and applied to the dynamic data to correct the unique instantaneous phase shifting errors. The correction leverages two aspects of the instantaneous phase shifting configuration. First, the change in error due to the dynamic variation under test (e.g. deformable mirror) will not grossly affect our error correction. Second, all measurements are made in a common configuration. This means that nothing changes between the single color and color-multiplexed instantaneous measurements except for the pattern displayed on the screen (i.e. common configuration). This constitutes the basis for our QSCC error compensation method.

Simply stated, to compensate the unique instantaneous errors, the difference between a conventional phase shifting measurement and an instantaneous measurement for a common nominal state (e.g. zero voltage applied to the deformable mirror) is computed. The difference map is then applied as a QSCC correction to the dynamic data set in the surface height domain. One could apply it in the slope or wrapped phase domain, but the compensation is most clearly visualized as a height difference. The QSCC correction accounts for any nonlinear response or color cross-talk in both the screen and camera as well as any other errors that we have yet model or simulate. This is the beauty of such an error compensation, it is simple to apply and yet it captures all sources of error.

An uncorrected map and a corrected map is shown in FIGS. 8(a) and (b), respectively, to demonstrate the fidelity of the error correction method. Each map is the result of a single measurement of the deformable mirror with a single actuator at a fixed voltage. In FIG. 8(a), an instantaneous measurement is shown where Zernike polynomials 1-100 (standard ordering) were subtracted in order to clearly show the high frequency errors. Significant double frequency error (nonlinear error in phase) were observed, which is common in phase shifting interferometry (Liu, F., et al., Opt. Express 23 (8), 10794-10807 (2015); P. de Groot, Appl. Opt. 44 (33), 7062-7069 (2005); and Wang & Han, Opt. Lett. 29 (14), 1671-1673 (2004)), along with color effects that further distort the surface and lead to more high frequency errors. With the new error correction, the surface RMS was improved by 40%, from 13 down to 7 nm RMS as shown in FIG. 8(b), particularly addressing the double frequency fringe print-through errors. Although there are still some higher order errors after the compensation due to the quasi-static assumption, it is still clear that the error correction takes care of most of the non-linearity related issues. The difference between the corrected and uncorrected surface is then given in FIG. 8(c), to show the amount of correction that the QSCC method generates. Note that it is especially good at removing the mid-to-high spatial frequency errors. According to particular aspects, therefore, despite the new challenges that the instantaneous phase mapping deflectometry methods face and the hardware limitations, measurement of a surface that inspires confidence in the application of this technique to precision metrology is provided.

Figures 9A, 9B, 9C:
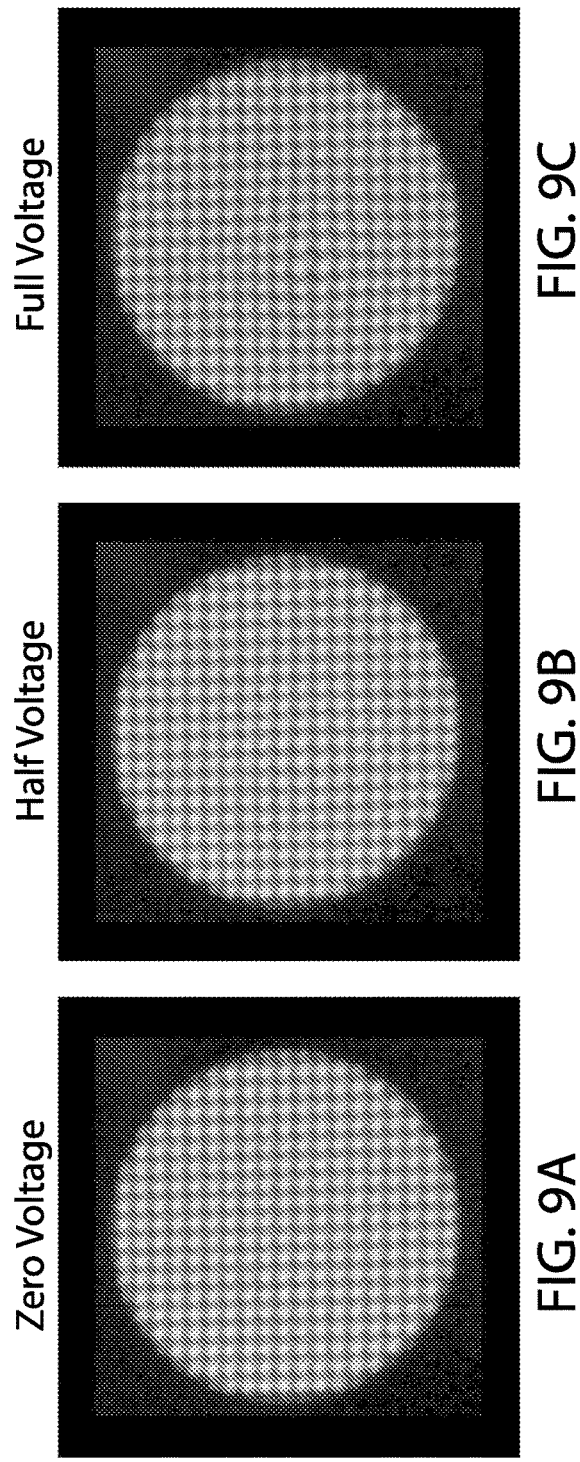

The quasi-static component of the error correction method is limited in the range of surface deviations over which it is applicable. However, across the full range of the deformable mirror's actuator motion (approx. 5 μm) it is a valid assumption. To put this in context, a HeNe interferometer operating at a wavelength of $\lambda=0.633$ μm will generate approx. 17 fringes across this area. In order to provide a more tangible understanding of the observed fringe deviations, three raw images collected during the experiment are shown in FIG. 9. The first image in FIG. 9(a) is the image of the deformable mirror at zero applied voltage. This is the common nominal state used in the QSCC correction. FIG. 9(b) gives the image corresponding to the mirror surface that was analyzed in FIG. 6 and FIG. 8. The image in FIG. 9(c) is the actuator at full stroke, which generates a deviation of the fringe pattern on the order of half a fringe.

In order to implement the QSCC method, the entire data processing pipeline must remain constant for each measurement. This guarantees that the errors will propagate in the same manner, and therefore the correction generated from the nominal state is valid. In particular, during the phase unwrapping step where a flood-fill method is applied, a quality function is used that is constant across all data sets. This is necessary because the flood-fill method may return a different phase value if it is started from a different point, or if it is guided across the map on a different path between data sets. This same mentality must be applied to any other function such as zonal integration or Fourier separation. Without the consistency in data processing the principles behind QSCC are violated.

According to additional aspects, further data processing level instantaneous error correction methods are achieved by improving the error through hardware upgrades. For example, a specialized detector with better color filters, reducing the crosstalk between phase shifts can be fabricated. As demonstrated in the art (J. L. Flores, J. L., et al., *Appl. Opt.* 54 (30), 8827-8834 (2015)), the cross-talk error can seriously affect the measurement accuracy In yet further aspects, more color filters are used to allow for a larger number of phase shifts per instantaneous measurement, driving down the nonlinear error associated with phase shifting. Understanding the chromatic aberrations and color transmission function of the camera lens also improves the accuracy of the system. In additional aspects, the screen filters are improved to give better display color discrimination. The output from each color pixel then only registers on the corresponding colored detector pixel. Many of the errors seen in the instantaneous phase shifting deflectometry measurement can be decreased through custom hardware according to a specific accuracy and precision requirement for a given application.

System Calibration:

To obtain such good agreement between the instantaneous phase mapping deflectometry implemented on the iPhone® and the interferometer, only a few calibration steps were performed.

First, the stated goal was to measure the deformable mirror's dynamic influence function. This means that we were insensitive to absolute shape terms, such as tip/tilt, power, astigmatism, coma, spherical, etc., which require significant calibration to measure accurately. However, we were sensitive t0 the low order shape changes, which we can certainly still measure (see FIG. 5). To meet this calibration specification, the relevant distances were measured with an accuracy of approx. 2 μm, and the shape of the screen or camera surfaces were not measured, assuming that they were both planar. If the goal, however, was to measure absolute surfaces down to low order terms, we have established techniques to measure and quantify all the required geometric parameters. A good example of this capability is the calibration performed for the measurement of a segment of the Giant Magellan Telescope primary (Su, P., et. al., "SCOTS: A reverse Hartmann test with high dynamic range for Giant Magellan Telescope primary mirror segments," Proc. SPIE 8450, 84500W (2012)); or measuring high precision x-ray mirrors (P. Su, P., et al., "Non-null full field X-ray mirror metrology using SCOTS: a reflection deflectometry approach," oe20 11 (2012)). In both methods, a laser tracker was used to accurately measure the coordinates of each component, and characterize the screen profile. Further calibration of the camera's distortion and imaging aberrations was performed using fiducials (measured by laser tracker). A reference surface may also be used to calibrate the systematic errors. Different levels of calibration may be applied depending on the accuracy of the low order absolute surface shape that the measurement requires. For our case study with the deformable mirror, no such low order absolute shape calibration was required, so we did not perform them. The other minor calibration that we performed was a first order simple distortion correction. In essence, this is a lateral calibration that sets the pixel size on the mirror surface, or the distance between measured slope points. The lateral calibration was determined by using the interferometry data as a reference, such that the peak width was matched. Note that the interferometer data also needed a lateral calibration step, so both methods suffer from this ambiguity. The presently disclosed instantaneous phase mapping deflectometry system does not require extensive calibration to measure the dynamic influence function of a deformable mirror and therefore we did not perform excessive calibration.

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Various embodiments of the invention can specifically include or exclude any of these variations or elements.

In some embodiments, the numbers expressing quantities used to describe and claim certain embodiments of the application are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims. The claims therefore may contain different combinations of elements described in the specification and examples.

Preferred embodiments of this application are described herein. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the invention. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Literature references cited and incorporated by reference herein for their respective teachings:

1. G. P. Butel, G. A. Smith, and J. H. Burge, "Deflectometry using portable devices," Opt. Eng. 54(12), 025111 (2015).

2. P. Su, R. E. Parks, L. Wang, R. P. Angel, and J. H. Burge, "Software configurable optical test system: a computerized reverse Hartmann test," Appl. Opt. 49(23), 4404-4412 (2010).

3. M. Knauer, J. Kaminski, and G. Häusler, "Phase measuring deflectometry: a new approach to measure specular free-form surfaces," Proc. SPIE 5457 366-376 (2004).

4. T. Bothe, W. Li, C. von Kopylow, and W. Jüptner, "High-resolution 3D shape measurement on specular surfaces by fringe reflection," Proc. SPIE 5457 411-422 (2004).

5. P. Su et. al., "SCOTS: A reverse Hartmann test with high dynamic range for Giant Magellan Telescope primary mirror segments," Proc. SPIE 8450, 84500W (2012).

6. G. P. Butel, G. A. Smith, and J. H. Burge, "Optimization of dynamic structured illumination for surface slope measurements," Proc. SPIE 8493, 84930S (2012).

7. M. Novak, J. Millerd, N. Brock, M. North-Morris, J. Hayes, and J. Wyant, "Analysis of a micropolarizer array-based simultaneous phase-shifting interferometer," Appl. Opt. 44(32), 6861-6868 (2005).

8. J. E. Millerd, and J. Wyant. "Simultaneous phase-shifting Fizeau interferometer," U.S. Pat. No. 7,230,718 (2007).

9. M. Takeda. "Spatial-carrier fringe-pattern analysis and its applications to precision interferometry and profilometry: An overview," Elsevier Ind. Met., 79-99 (1990).

10. D. M. Sykora, and P. de Groot, "Instantaneous measurement Fizeau interferometer with high spatial resolution," Proc. SPIE 8126, 812610 (2011).

11. B. Kimbrough, J. Millerd, J. Wyant, and J. Hayes, "Low coherence vibration insensitive Fizeau interferometer," Proc. SPIE 6292 62920F (2006).

12. H. Schreiber, and J. H. Bruning, "Phase shifting interferometry," in Optical Shop Testing, Third Edition, D. Malacara, ed. (Wiley, 2007).

13. P. Xie, M. Tang, and X. Wei, "Three-dimensional shape measurement of specular surfaces by orthogonal composite fringe reflection," Proc. SPIE 8200 (14), 1-8 (2011).

14. H. Yue, X. Su, and Y. Liu, "Fourier transform prfilometry based on composite structured light pattern," Opt. and Laser Tech. 39, 1170-1175 (2007).

15. Y. Wu et. al., "Dynamic specular surface measurement based on color encoded fringe reflection technique," Opt. Eng. 55(22), 024104 (2016).

16. L. Huang, C. S. Ng, and A. K. Asundi, "Dynamic three-dimensional sensing for specular surface with monoscopic fringe reflectometry," Opt. Express 19 (13), 12809-12814 (2011).

17. Z. H. Zhang, "Review of single-shot 3D shape measurement by phase calculation-based fringe projection techniques," Opt. and Lasers in Eng. 50, 1097-1106 (2012).

18. T. Su, S. Wang, R. E. Parks, P. Su, J. H. Burge, "Measuring rough optical surfaces using scanning long-wave optical test system. 1. Principle and implementation," Appl. Opt. 52(29) 7117-7126 (2013).

19. A. Asundi, and Z. Wensen. "Fast phase-unwrapping algorithm based on a gray-scale mask and flood fill," Appl. Opt. 37(23), 5416-5420 (1998).

20. W. H. Southwell, "Wave-front estimation from wave-front slope measurements," J. Opt. Soc. Am. 70(8), 998-1006 (1980).

21. Y. Wu et. al., "Improved composite Fourier transform profilometry," Opt. and Laser Tech. 44, 2037-2042 (2012).

22. L. Huang et. al., "Comparison of Fourier transform, windowed Fourier transform, and wavelet transform methods for phase extraction from a single fringe pattern in fringe projection profilometry," Opt. and Lasers in Eng. 48, 141-148 (2009).

23. Q. Kemao, "Two-dimensional windowed Fourier transform for fringe pattern analysis: Principles, applications, and implementations," Opt. and Lasers in Eng. 45, 304-317 (2007).

24. Q. Kemao, "Windowed Fourier transform for fringe pattern analysis," Appl. Opt. 43 (13), 2695-2702 (2004).

25. P. Su, Y. Wang, J. H. Burge, K. Kaznatchev, and M. Idir, "Non-null full field X-ray mirror metrology using SCOTS: a reflection deflectometry approach," oe20 11 (2012).

26. C. Faber, E. Olesch, R. Krobot, and G. Häusler, "Deflectometry challenges interferometry—the competition gets tougher!" Proc. SPIE 8493 84930R (2012).

27. F. Liu, Y. Wu, and F. Wu, "Correction of phase extraction error in phase-shifting interferometry based on Lissajous figure and ellipse fitting technology," Opt. Express 23 (8), 10794-10807 (2015).

28. P. de Groot, "Generating fringe-free images from phase-shifted interferometry data," Appl. Opt. 44 (33), 7062-7069 (2005).

29. Z. Wang and B. Han, "Advanced iterative algorithm for phase extraction of randomly phase-shifted interferograms," Opt. Lett. 29 (14), 1671-1673 (2004).

30. M. Kuchel "Two grating lateral shearing wavefront sensor," U.S. Pat. No. 7,889,356 (2011).

31. J. L. Flores, J. A. Ferrari, G. G. Torales, R. Legarda-Saenz, and A. Silva, "Color-fringe pattern profilometry using a generalized phase-shifting algorithm," Appl. Opt. 54 (30), 8827-8834 (2015).

32. Trumper, I., Choi, H., and Kim, D., "Instantaneous phase shifting deflectometry," Optics Express 24, 27993-28007 (2016).

33. Su, P., Parks, R., Wang, L., Angel, R., and Burge, J., "Software configurable optical test system: a computerized reverse Hartmann test," Applied Optics 49, 4404{4412 (2010).

34. Su, P., Wang, S., Khreishi, M., Wang, Y., Su, T., Zhou, P., Parks, R., Law, K., Rascon, M., Zobrist, T., Martin, H., and Burge, J., "Scots: A reverse Hartmann test with high dynamic range for giant Magellan telescope primary mirror segments," Proc. SPIE 8450, 1{9 (2012).

35. Butel, G., Smith, G., and Burge, J., "Optimization of dynamic structured illumination for surface slope measurements," Proc. SPIE 8493, 1-12 (2012).

36. Malacara, Z. and Servin, M., "Interferogram analysis for optical testing], vol. 84, CRC press (2016).

37. Asundi, A. and Wensen, Z., "Fast phase-unwrapping algorithm based on a gray-scale mask and flood fill, "Applied optics 37(23), 5416-5420 (1998).

38. Madec, P.-Y., "Overview of deformable mirror technologies for adaptive optics and astronomy," (2012).

39. Noll, R. J., "Zernike polynomials and atmospheric turbulence," J. Opt. Soc. Am. 66, 207-211 (March 1976).

The invention claimed is:

1. A non-contact instantaneous phase mapping deflectometry system to measure a surface, comprising:
    a display positioned proximate a first side of a surface to be measured;
    a display pattern generator configured to generate a multiplexed pattern to display on the display, the multiplexed display pattern comprising, in each of two orthogonal directions, at least three fringe patterns, each fringe pattern comprising a plurality of fringes sufficient to provide a carrier frequency such that component x and y fringes are distinguishable in Fourier domain and each fringe pattern having distinct color-encoded phase shift information to provide a distinctly multiplexed display pattern comprising, in each of two orthogonal directions, a phase-shifted multiplexed fringe pattern having distinct color-encoded phase shift information;
    an imaging device positioned to detect an input image comprising at least a portion of the phase-shifted multiplexed fringe pattern after interaction with the surface, and to generate an electronic image thereof, the imaging device having at least three separately readable color channels to obtain at least three respective sets of data corresponding to at least three phase shifts to provide at least three phase-shifted images; and
    an image analyzer configured to analyze each of the at least three phase-shifted images by Fourier transform to provide distinct peaks in the Fourier domain at locations corresponding to the carrier frequencies of the fringes in the x and y directions, the image analyzer configured to apply filters or masks that isolate only x or y frequencies to decompose each of the at least three phase-shifted images into two separate one-directional fringe images, the image analyzer configured to apply an inverse Fourier transform to the filtered data to reconstruct the one-directional fringe patterns that made up the input image to provide, based on a single input image, at least six unique outputs corresponding to the at least three phase shift fringe patterns in both orthogonal directions required for reconstruction of the surface.

2. The system of claim 1, wherein no information is eliminated from raw measurement data during the Fourier domain processing.

3. The system of claim 1, wherein the system is further configured to:
    generate four data sets comprising two wrapped phases and corresponding modulation, one in each direction;
    unwrap the phases to convert the phases to slope data given in two directions; and
    integrate the slope data to obtain a reconstructed surface.

4. The system of claim 1, wherein the at least three phase-shifted images comprise red, green, and blue phase-shifted images.

5. The system of claim 1, wherein a geometry of the system is configured to be adjustable either by tilting or translating the display screen and the imaging device until a set of measured fringes are obtained that enable removal of an ambiguity in the Fourier domain or fringe direction.

6. The system of claim 1, wherein the system is further configured to:
    compute a difference between a conventional phase shifting measurement and an instantaneous measurement for a common nominal state to provide a difference map; and
    apply the difference map as a correction in a surface height domain of a dynamic data set to remove spatial frequency errors.

7. A non-contact instantaneous phase mapping deflectometry system to measure a surface, comprising:
    a programmable display screen that is programmed to display a phase-shifted multiplexed fringe pattern having, in each of two orthogonal directions, distinct color-encoded phase shift information, such that upon the screen being placed at a known distance in front of a specular surface, the display screen is operable to produce an input pattern reflected from the surface;

an imaging device located proximate the display screen and focused on the surface, the imaging device configured to generate an output image to provide slope information in two orthogonal directions based on a single input image comprising at least a portion of the input pattern reflected from the surface; and a computing device configured to calculate slopes of the surface based on the slope information and to integrate the slopes to give the surface topography, wherein the computing device is further configured to:

compute a difference between a conventional phase shifting measurement and an instantaneous measurement for a common nominal state to provide a difference map; and apply the difference map as a correction in a surface height domain of a dynamic data set to remove spatial frequency errors.

8. The system of claim 7, wherein the imaging device is positioned to detect the input image, and to generate an electronic image thereof, the imaging device having at least three separately readable color channels to obtain at least three respective sets of data corresponding to the color-encoded phase shift information to provide at least three phase-shifted images, and wherein the system is configured to analyze each of the at least three phase-shifted images by Fourier transform to provide distinct peaks in the Fourier domain at the locations corresponding to the carrier frequencies of the display fringes in the x and y directions, the system configured to apply filters or masks that isolate only the x or y frequency to decompose each of the at least three phase-shifted images into two separate one-directional fringe images, the system configured to apply an inverse Fourier transform to the filtered data to reconstruct the one-directional fringe patterns that made up the input image to provide, based on a single input image, at least six unique outputs in both orthogonal directions required for reconstruction of the surface.

9. The system of claim 7, wherein the system is further configured to:

generate four data sets comprising two wrapped phases and corresponding modulation, one in each direction;

unwrap the phases to convert the phases to slope data given in two directions; and integrate the slope data to obtain a reconstructed surface.

10. The system of claim 7, wherein the plurality of fringes is sufficient to provide a carrier frequency such that the component x and y fringes are distinguishable in the Fourier domain.

11. The system of claim 8, wherein the at least three phase-shifted images comprise red, green, and blue phase-shifted images.

12. The system of claim 7, wherein a geometry of the system is configured to be adjustable either by tilting or translating the display screen and the imaging device until a set of measured fringes are obtained to enable removal of an ambiguity in the Fourier domain or fringe direction.

13. The system of claim 7, wherein no information is eliminated from raw measurement data during the Fourier domain processing.

14. A non-contact instantaneous phase mapping deflectometry method to measure a surface, comprising:

positioning a display proximate a first side of a surface to be measured;

generating a multiplexed pattern to display on the display, the multiplexed display pattern comprising, in each of two orthogonal directions, at least three fringe patterns, each fringe pattern comprising a plurality of fringes sufficient to provide a carrier frequency such that component x and y fringes are distinguishable in Fourier domain and each fringe pattern having distinct color-encoded phase shift information to provide a distinctly multiplexed display pattern comprising, in each of two orthogonal directions, a phase-shifted multiplexed fringe pattern having distinct color-encoded phase shift information;

detecting, using an imaging device, an input image comprising at least a portion of the phase-shifted multiplexed fringe pattern after interaction with the surface to obtain at least three respective sets of data corresponding to the color-encoded phase shift information to provide at least three phase-shifted images;

analyzing the at least three phase-shifted images by Fourier transform to provide distinct peaks in the Fourier domain at the locations corresponding to the carrier frequencies of the fringes in the x and y directions;

filtering or masking to isolate only x or y frequencies to decompose each of the at least three phase-shifted images into two separate one-directional fringe images; and applying an inverse Fourier transform to the filtered data to reconstruct the one-directional fringe patterns that made up the input image to provide, based on a single input image, at least six unique outputs corresponding to the at least three phase shift fringe patterns in both orthogonal directions required for reconstruction of the surface.

15. The method of claim 14, wherein no information is eliminated from raw measurement data during the Fourier domain processing.

16. The method of claim 14, further comprising:

generating four data sets comprising two wrapped phases and corresponding modulation, one in each direction;

unwrapping the phases to convert the phases to slope data given in two directions; and integrating the slope data to obtain a reconstructed surface.

17. The method of claim 14, wherein the at least three phase-shifted images comprise red, green, and blue phase-shifted images.

18. The method of claim 14, further comprising:

computing a difference between a conventional phase shifting measurement and an instantaneous measurement for a common nominal state to provide a difference map; and applying the difference map as a correction in a surface height domain of a dynamic data set to remove spatial frequency errors.

19. A non-contact instantaneous phase mapping deflectometry method to measure a surface, comprising:

displaying, on a display screen, a phase-shifted multiplexed fringe pattern having, in each of two orthogonal directions, distinct color-encoded phase shift information, such that upon the screen being placed at a known distance in front of a specular surface, the display screen is operable to produce an input pattern reflected from the surface;

generating an output image, using an imaging device located proximate the display screen and focused on the surface, to provide slope information in two orthogonal directions based on a single input image comprising at least a portion of the input pattern reflected from the surface;

calculating, using a computing device, slopes of the surface and integrating the slopes to give the surface topography;

computing a difference between a conventional phase shifting measurement and an instantaneous measurement for a common nominal state to provide a difference map; and applying the difference map as a correction in a surface height domain of a dynamic data set to remove spatial frequency errors.

20. The method of claim 19, wherein the imaging device is positioned to detect the input image, and to generate an electronic image thereof, the imaging device having at least three separately readable color channels to obtain at least three respective sets of data corresponding to the color-encoded shift information to provide at least three phase-shifted images, and wherein the system is configured to analyze each of the at least three phase-shifted images by Fourier transform to provide distinct peaks in the Fourier domain at the locations corresponding to the carrier frequencies of the display fringes in the x and y directions, the system configured to apply filters or masks that isolate only the x or y frequency to decompose each of the at least three phase-shifted images into two separate one-directional fringe images, the system configured to apply an inverse Fourier transform to the filtered data to reconstruct the one-directional fringe patterns that made up the input image to provide, based on a single input image, at least six unique outputs in both orthogonal directions required for reconstruction of the surface.

21. The method of claim 19, further comprising:

generating four data sets comprising two wrapped phases and corresponding modulation, one in each direction;

unwrapping the phases to convert the phases to slope data given in two directions; and integrating the slope data to obtain a reconstructed surface.

22. The method of claim 19, wherein the plurality of fringes is sufficient to provide a carrier frequency such that the component x and y fringes are distinguishable in the Fourier domain.

23. The method of claim 20, wherein the at least three phase-shifted images comprise red, green, and blue phase-shifted images.

24. The method of claim 19, wherein no information is eliminated from raw measurement data during the Fourier domain processing.

* * * * *